(12) United States Patent
Hashimoto

(10) Patent No.: US 12,350,778 B2
(45) Date of Patent: Jul. 8, 2025

(54) CUTTING TOOL, CUTTING STRUCTURE, DATA COLLECTION SYSTEM, AND CUTTING TOOL HOLDER

(71) Applicant: KYOCERA CORPORATION, Kyoto (JP)

(72) Inventor: Shigetaka Hashimoto, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 565 days.

(21) Appl. No.: 17/637,803

(22) PCT Filed: Aug. 28, 2020

(86) PCT No.: PCT/JP2020/032612
§ 371 (c)(1),
(2) Date: Feb. 24, 2022

(87) PCT Pub. No.: WO2021/039967
PCT Pub. Date: Mar. 4, 2021

(65) Prior Publication Data
US 2022/0281046 A1 Sep. 8, 2022

(30) Foreign Application Priority Data
Aug. 29, 2019 (JP) ................. 2019-156713

(51) Int. Cl.
*B23Q 17/09* (2006.01)
*B23B 27/16* (2006.01)

(52) U.S. Cl.
CPC .............. *B23Q 17/09* (2013.01); *B23B 27/16* (2013.01); *B23B 2260/128* (2013.01)

(58) Field of Classification Search
CPC ... B23B 29/12; B23B 2260/128; B23Q 17/09; B23Q 17/0952; B23Q 17/0966; B23Q 17/0971; B23Q 17/0985; B23Q 17/12
See application file for complete search history.

(56) References Cited

U.S. PATENT DOCUMENTS 5,251,522 A * 10/1993 Chin-Long ............ B23Q 17/09
 82/134
6,586,862 B1 * 7/2003 Cselle ............... B23B 29/03432
 310/328
2009/0044655 A1 2/2009 Delouis et al.
(Continued)

FOREIGN PATENT DOCUMENTS

CN 102873353 A 1/2013
DE 19701462 A1 * 7/1998 ............ B23Q 17/09
(Continued)

*Primary Examiner* — Sunil K Singh
*Assistant Examiner* — Eric Daniel Whitmire
(74) *Attorney, Agent, or Firm* — HAUPTMAN HAM, LLP

(57) ABSTRACT

A cutting tool may include a base body, a tip, a sensor, and a connector. The base body may have a shank section and a securing section located at a front end of the shank section. The tip may be secured to the securing section and may have a cutting edge. The sensor may be accommodate inside the shank section. The connector may be located inside the shank section and may be oriented outward of the shank section. The connector may include a recess recessed relative to an outer surface of the shank section, and may also include a terminal exposed within the recess and electrically connected to the sensor.

12 Claims, 12 Drawing Sheets

(56) References Cited

U.S. PATENT DOCUMENTS

2016/0045994 A1\* 2/2016 Jayr .................. B23Q 17/0966
407/66
2019/0299352 A1 10/2019 Michiwaki

FOREIGN PATENT DOCUMENTS

| DE | 19925193 A1 | 10/2000 |
| FR | 2851818 A1 | 9/2004 |
| JP | 2002542049 A | 12/2002 |
| JP | 200394209 A | 4/2003 |
| JP | 201220359 A | 2/2012 |
| JP | 2016225272 A | 12/2016 |
| WO | 2018047834 A1 | 3/2018 |

\* cited by examiner

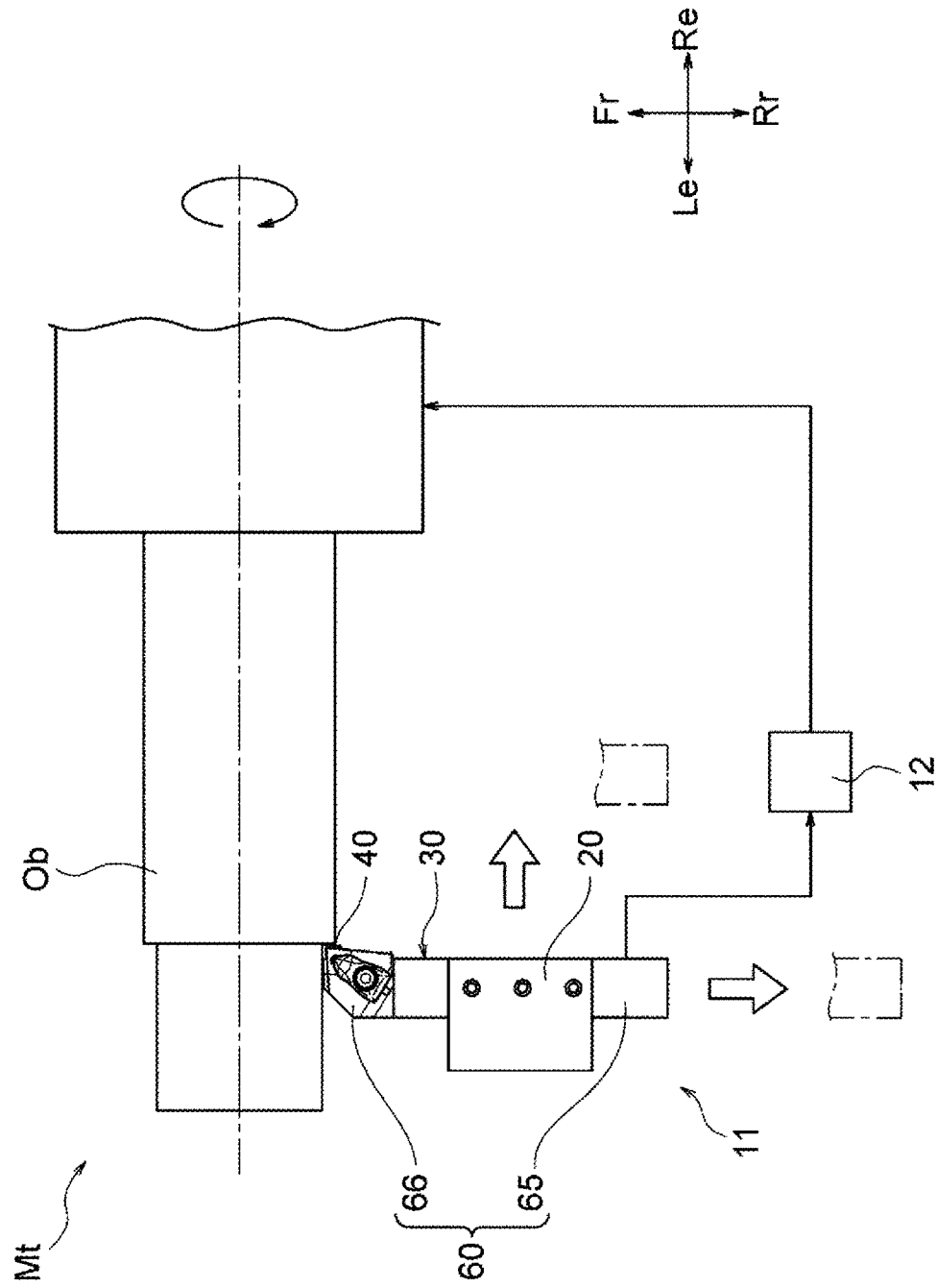

FIG. 11
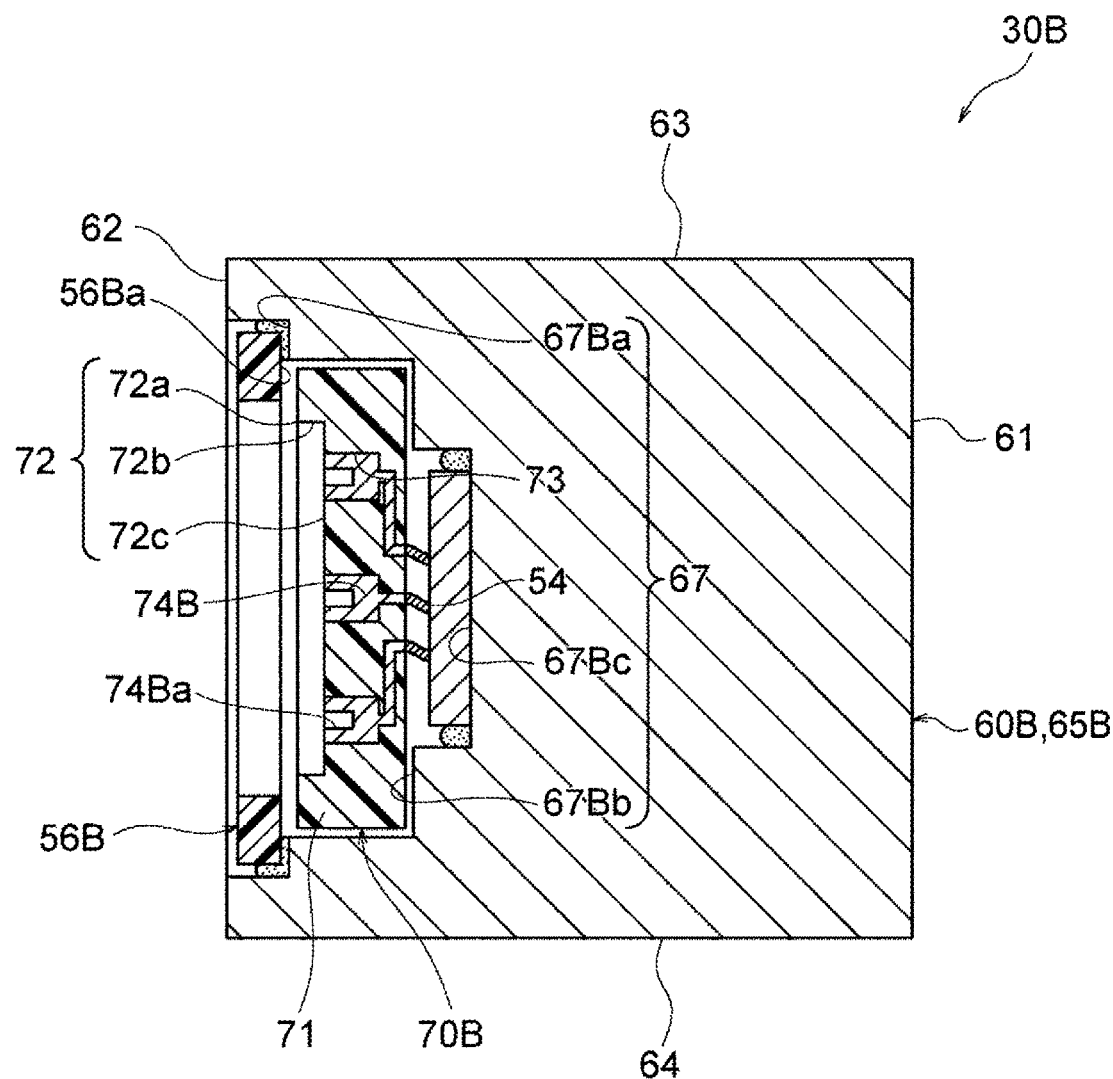
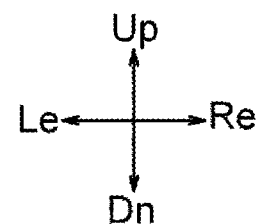

CUTTING TOOL, CUTTING STRUCTURE, DATA COLLECTION SYSTEM, AND CUTTING TOOL HOLDER

RELATED APPLICATIONS

The present application is a National Phase of International Application Number PCT/JP2020/032612, filed Aug. 28, 2020, and claims priority to Japanese Application Number 2019-156713, filed Aug. 29, 2019.

TECHNICAL FIELD

The present disclosure may relate to cutting tools, cutting structures, data collection systems, and cutting tool holders.

BACKGROUND ART

For example, a known cutting tool may be attached to a machine tool and may cut a part of an object (e.g., wood or metal) to process the object into a desired shape and size. Patent Literature 1 (cutting tool) indicated below may be known as such a cutting tool.

CITATION LIST

Patent Literature

PTL 1: Japanese Unexamined Patent Application Publication No. 2012-20359

SUMMARY OF INVENTION

A cutting tool according to an aspect of the present disclosure may include a base body, a tip, a sensor, and a connector. The base body may have a shank section and a securing section located at a front end of the shank section. The tip may be secured to the securing section and may have a cutting edge. The sensor may be accommodated inside the shank section. The connector may be located inside the shank section and may be oriented outward of the shank section. The connector may include a recess recessed relative to an outer surface of the shank section, and may also include a terminal exposed within the recess and electrically connected to the sensor.

A cutting structure according to an aspect of the present disclosure may include the cutting tool, a cutter holder to which the cutting tool is secured, and a second connector connected to the connector.

A data collection system according to an aspect of the present disclosure may include the cutting structure, and a storage unit that accumulates information about a physical value detected by the sensor via the connector and the second connector.

A cutting tool holder according to an aspect of the present disclosure may include a base body, a sensor, and a connector. The base body may have a shank section and a securing section located at a front end of the shank section. The sensor may be accommodated inside the shank section. The connector may be located inside the shank section and may be oriented outward of the shank section. The connector may include a recess recessed relative to an outer surface of the shank section, and may also include a terminal exposed within the recess and electrically connected to the sensor.

BRIEF DESCRIPTION OF DRAWINGS

FIG. 1 schematically illustrates an entire data collection system.

FIG. 11 is a sectional view taken along line XI-XI shown in FIG. 10.

DESCRIPTION OF EMBODIMENTS

Figure 2A:
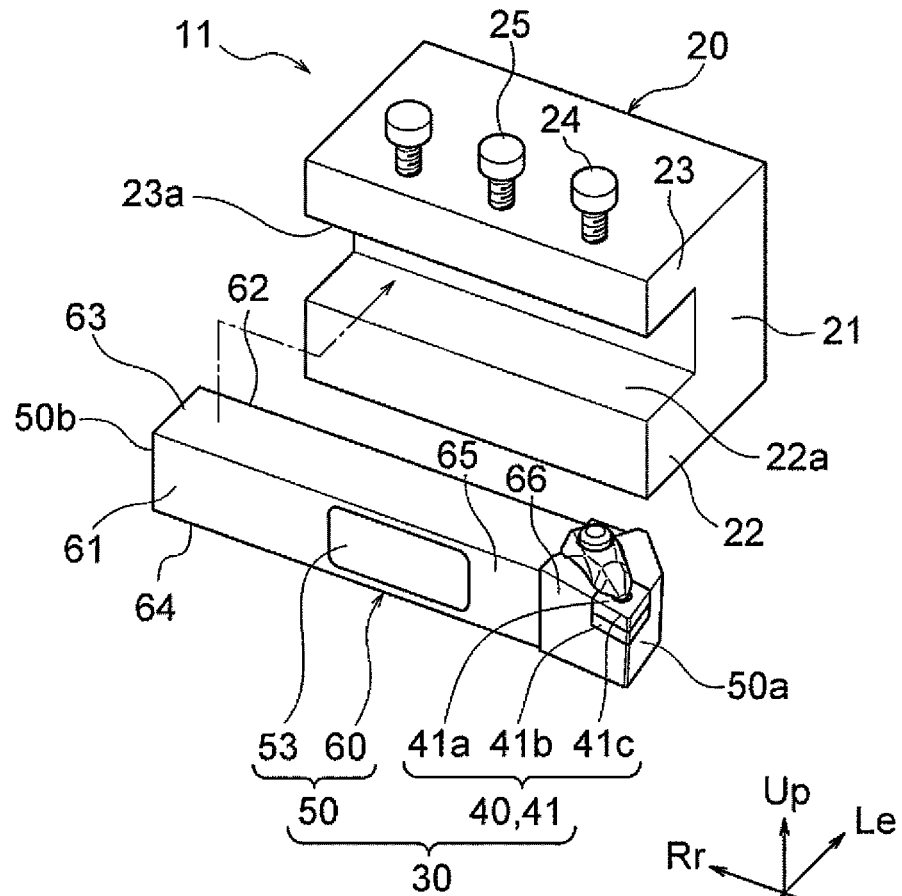
FIG. 2A and FIG. 2B illustrate a cutting tool and a cutter holder shown in FIG. 1.

Embodiments of the present disclosure will be described below by using the appended drawings. In the description, the terms front and rear may be used for specifying the positional relationship in the longitudinal direction of a cutting tool, the side where a tip is located in the longitudinal direction may be conveniently defined as the front side, and the side opposite the front side in the longitudinal direction may be conveniently defined as the rear side. The terms left and right may be used for specifying the positional relationship when an end of the cutting tool is viewed from the rear side. The terms up and down may be used for specifying the positional relationship when an end of the cutting tool is viewed from the rear side, similar to the terms left and right, and may be used for specifying the positional relationship in a direction orthogonal to the left-right direction. In the drawings, Fr may denote front, Rr may denote rear, Le may denote left, Re may denote right, Up may denote up, and Dn may denote down. Furthermore, the reference drawings may be schematic and may sometimes have details omitted therefrom.

In the description of the present disclosure, expressions indicating, for example, front-rear, left-right, and up-down directions may be occasionally used. These expressions may be conveniently used in relation to the drawings for explaining the present disclosure and are not intended to limit the present disclosure. For example, a front end is not limited to a front end (i.e., an end at the front side), and a rear end is not limited to an end at the rear side. In other words, the front end may be read as one end (i.e., one of the ends), and the rear end may be read as the other end (i.e., the other one of the ends). The same may apply to the expressions related to the up-down direction, the left-right direction, and the like.

First Embodiment (Data Collection System)

Referring to FIG. 1, a data collection system 10 may have, for example, a cutter holder 20, a cutting tool 30 (e.g., a turning tool), and an information processing device 12. The cutter holder 20 may be one of components constituting a machine tool Mt. For example, the cutting tool 30 may be secured to the cutter holder 20, and may have a function capable of inputting information to the external information processing device 12. The information processing device 12 can collect the information from the cutting tool 30. The machine tool Mt and the cutter holder 20 will be described below, and the cutting tool 30 and the information processing device 12 will be subsequently described.

(Machine Tool)

For example, the machine tool Mt may be a machine used for cutting (i.e., processing) an object Ob into a desired shape and size. The machine tool Mt may have, for example, the cutter holder 20 to which the cutting tool 30 is attachable. For example, the cutting tool 30 attached to the cutter holder 20 may be movable forward, rearward, leftward, rightward, upward, and downward in accordance with a manual operation, an automatic operation, or the like of the machine tool Mt. In response to such an operation (automatic or manual), for example, the cutting tool 30 may be pressed onto the rotating object Ob (e.g., wood or metal). Accordingly, the object Ob may be cut. Normally, the object Ob to be cut may be referred to as a workpiece.

(Cutter Holder)

Figure 2B:
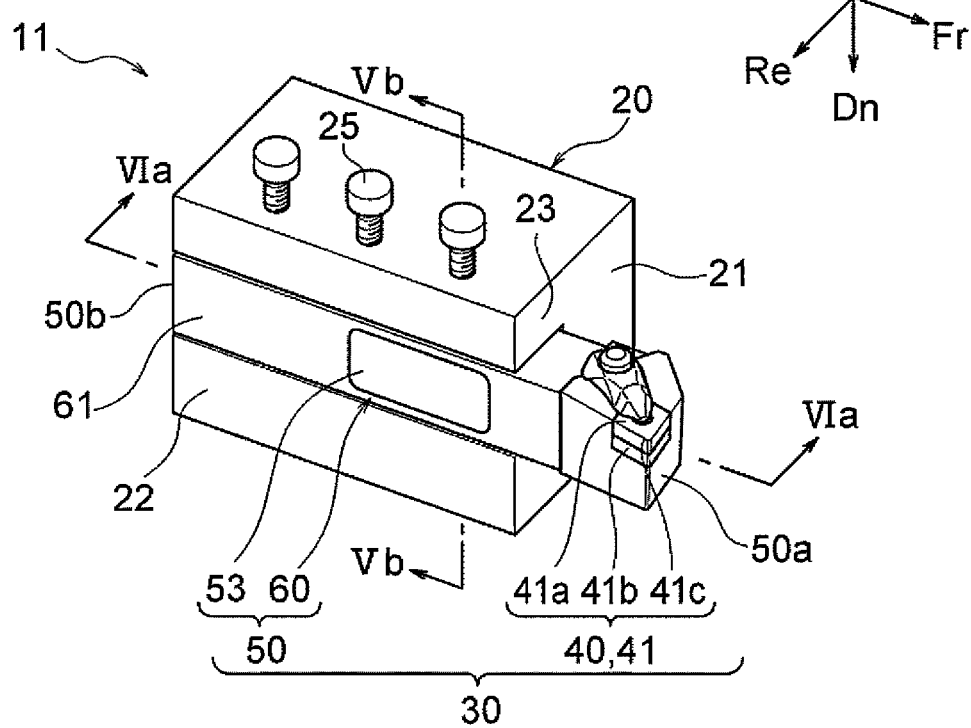

FIG. 2A may illustrate the cutter holder 20 before having the cutting tool 30 attached thereto, as well as the cutting tool 30. FIG. 2B may illustrate the cutter holder 20 in a state where the cutting tool 30 is attached thereto. The cutter holder 20 may have, for example, a side-surface abutment section 21, a first protrusion 22, a second protrusion 23, screw holes 24, and biasing sections 25. A side surface of the cutting tool 30 may be in abutment with the side-surface abutment section 21. The first protrusion 22 may protrude laterally (i.e., rightward in the drawing) from the side surface of the side-surface abutment section 21. The second protrusion 23 may protrude laterally (i.e., rightward in the drawing) from the side surface of the side-surface abutment section 21, and may face the first protrusion 22. The screw holes 24 may extend in the up-down direction through the second protrusion 23. The biasing sections 25 may be screwed in the screw holes 24 and may be components that bias the cutting tool 30 toward the first protrusion 22 (i.e., a placement surface 22a to be described below).

The first protrusion 22 may have the placement surface 22a located on the upper face thereof. The cutting tool 30 may be placed on the placement surface 22a. The second protrusion 23 may have an opposing surface 23a facing the placement surface 22a. The biasing sections 25 may abut on a shank section 65 of the cutting tool 30, to be described later, and bias the cutting tool 30 toward the placement surface 22a. Accordingly, the cutting tool 30 may be positioned (i.e., fixed) relative to the cutter holder 20. As in the example shown in FIGS. 2A and 2B, the placement surface 22a and the opposing surface 23a may be parallel to each other. The shape of the cutter holder 20 is not limited to the shape shown in FIGS. 2A and 2B. The specific configuration of the cutter holder 20 that can position the cutting tool 30 may be regarded as being appropriate.

(Cutting Tool)

The cutting tool 30 may be detachably attached to the machine tool Mt (i.e., the cutter holder 20). Examples of the cutting tool 30 may include an outer-diameter cutting tool used for performing a cutting process with respect to the outer diameter of the object Ob, an inner-diameter cutting tool used for performing a cutting process with respect to the inner diameter of the object Ob, a grooving tool used for forming a groove or the like in the object Ob, a threading tool, and a parting tool. The cutting tool 30 may also be referred to as a bit.

Figure 3:
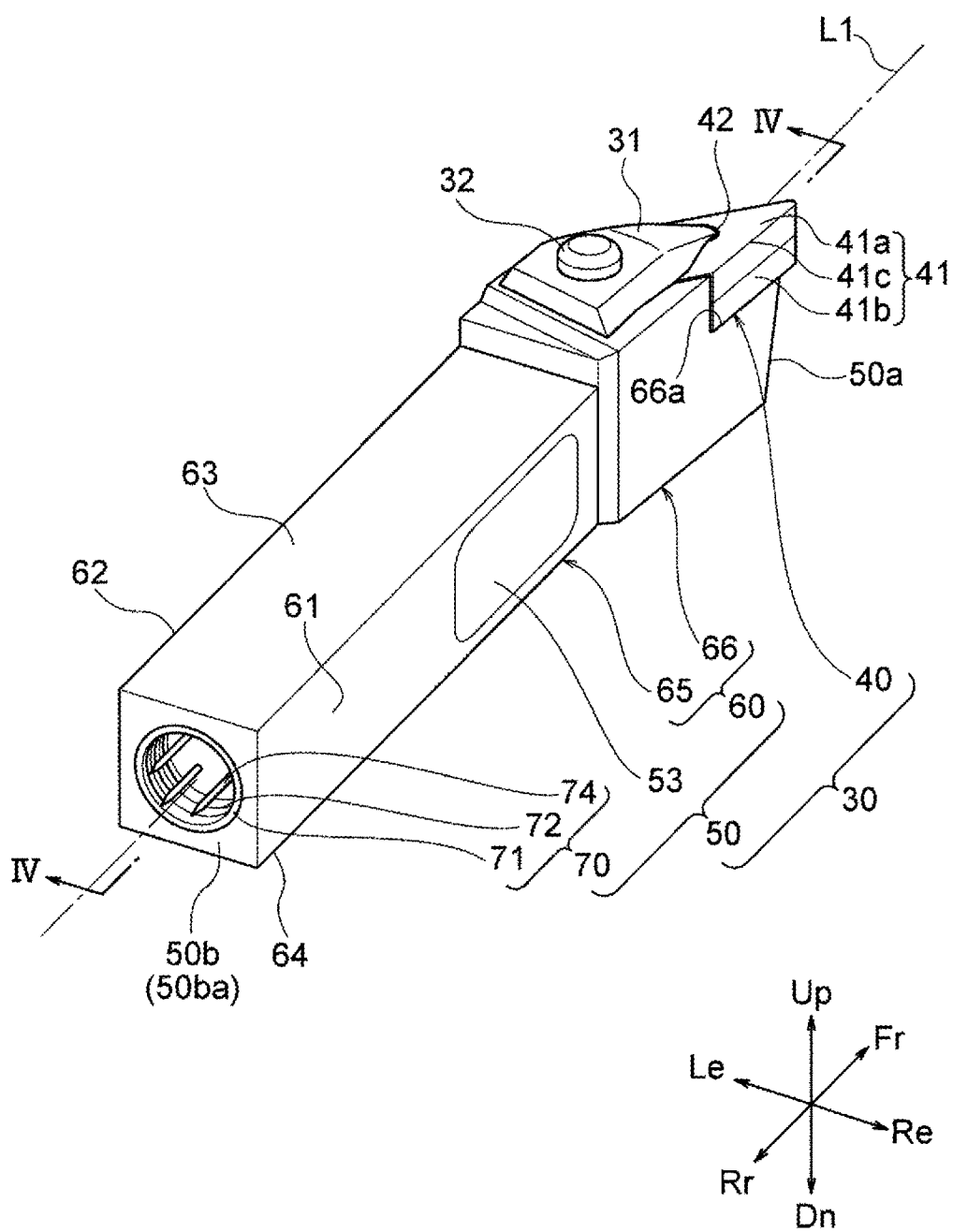
FIG. 3 is a perspective view of the cutting tool shown in FIG. 1.

Referring to FIG. 3, the cutting tool 30 may have, for example, a holder 50, a tip 40 secured at a front end 50a (also referred to as a first end 50a hereinafter) of the holder 50, and a clamp 31 to which the tip 40 is secured.

(Tip and Structure Surrounding Tip)

The tip 40 may be, for example, a replaceable insert called a throwaway tip. For example, the tip 40 may be located within a cutout 66a formed by cutting out the first end 50a of the holder 50, and may be secured by using the clamp 31. The tip 40 may be set to have any shape. The shape of the tip 40 may be changed in accordance with, for example, the material for and shape of the object Ob (see FIG. 1). For example, the tip 40 may have the shape of a rectangular plate. In another embodiment, the tip 40 may have the shape of a triangular plate or the shape of a pentagonal plate.

The tip 40 may be set to have any size. The thickness (i.e., the length in the up-down direction) of the tip 40 may be, for example, 5 mm or larger and 20 mm or smaller. The width (i.e., the length in the left-right direction) of the tip 40 may be, for example, 10 mm or larger and 20 mm or smaller. The size of the tip 40 may be changed in accordance with, for example, the material for the object Ob.

Any material may be set for the tip 40. For example, the material for the tip 40 may be cemented carbide or a cermet. The composition of cemented carbide may be, for example, WC—Co, WC—TiC—Co, and WC—TiC—TaC—Co. WC, Tic, and TaC may be hard particles. On the other hand, Co may be a binder phase. A cermet may be a sintered composite material obtained by combining metal with a ceramic component. A specific example of a cermet is, for example, a titanium compound having TiC and/or TiN as a main component.

For example, the surface of the tip 40 may be provided with (or does not have to be provided with) a coating by chemical vapor deposition or physical vapor deposition. The coating may have, for example, TiC, TiN, TiCN, and $Al_2O_3$ as components.

The tip 40 may at least partially have a blade 41 capable of cutting the object Ob. The blade 41 may be oriented outward of the holder 50 from the first end 50a.

(Blade Constituting Tip)

The blade 41 may have a rake face 41a, a flank face 41b, and a cutting edge 41c. The rake face 41a may serve as the upper surface of the blade 41. The flank face 41b may intersect with the rake face 41a and may serve as a side surface of the blade 41. The cutting edge 41c may be located at the boundary between the rake face 41a and the flank face 41b.

The rake face 41a may be where chips travel to when the object Ob is cut. The rake face 41a may have (or does not have to have) a groove and/or a protrusion. In a case where the rake face 41a has a groove and/or a protrusion, the chips of the cut object Ob can be readily divided according to predetermined lengths. Accordingly, the chips occurring from the object Ob may be less likely to become long. As a result, the chips may be less likely to become entwined with the cutting tool 30 and the object Ob. An angle between the flank face 41b and the rake face 41a may be appropriately set such that the tip 40 does not come into contact with the object Ob more than necessary.

The cutting edge 41c may be located along a ridge line serving as the boundary between the rake face 41a and the flank face 41b, and may be connected to the rake face 41a and the flank face 41b. When the object Ob is to be cut, the cutting edge 41c may be a part that cuts into the object Ob to directly contribute to the cutting of the object Ob. The cutting edge 41c may include (or does not have to include) a microscopic curve.

For example, the tip 40 may have a first through-hole 42 provided in the upper surface and the lower surface of the tip 40. The front end of the clamp 31 may be inserted downward into the first through-hole 42 from above. The clamp 31 may bias the tip 40 fitted in the cutout 66a downward. Accordingly, the tip 40 may be secured to the holder 50 (i.e., a securing section 66 to be described later) by being clamped between the base surface of the cutout 66a and the clamp 31. As in the example shown in FIG. 3, the clamp 31 may be secured by using a screw 32 screwed to the holder 50.

(Holder)

For example, the holder 50 may have a length from the front end 50a (i.e., first end 50a) to a rear end 50b (also referred to as a second end 50b hereinafter). For example, the holder 50 may have the shape of a rod. The holder 50 may be set to have any length. For example, the length of the holder 50 may be set in a range between 50 mm and 200 mm.

The holder 50 may be set to have any size. For example, the width (i.e., the length in the left-right direction) and the thickness (i.e., the length in the up-down direction) of the holder 50 may be 10 mm or more, 19 mm or more, 25 mm or more, or 50 mm or more. The width and the thickness of the holder 50 may be different from each other (or may be the same). Moreover, the thickness of the holder 50 may increase toward the front end 50a (or may be fixed).

Figure 4:
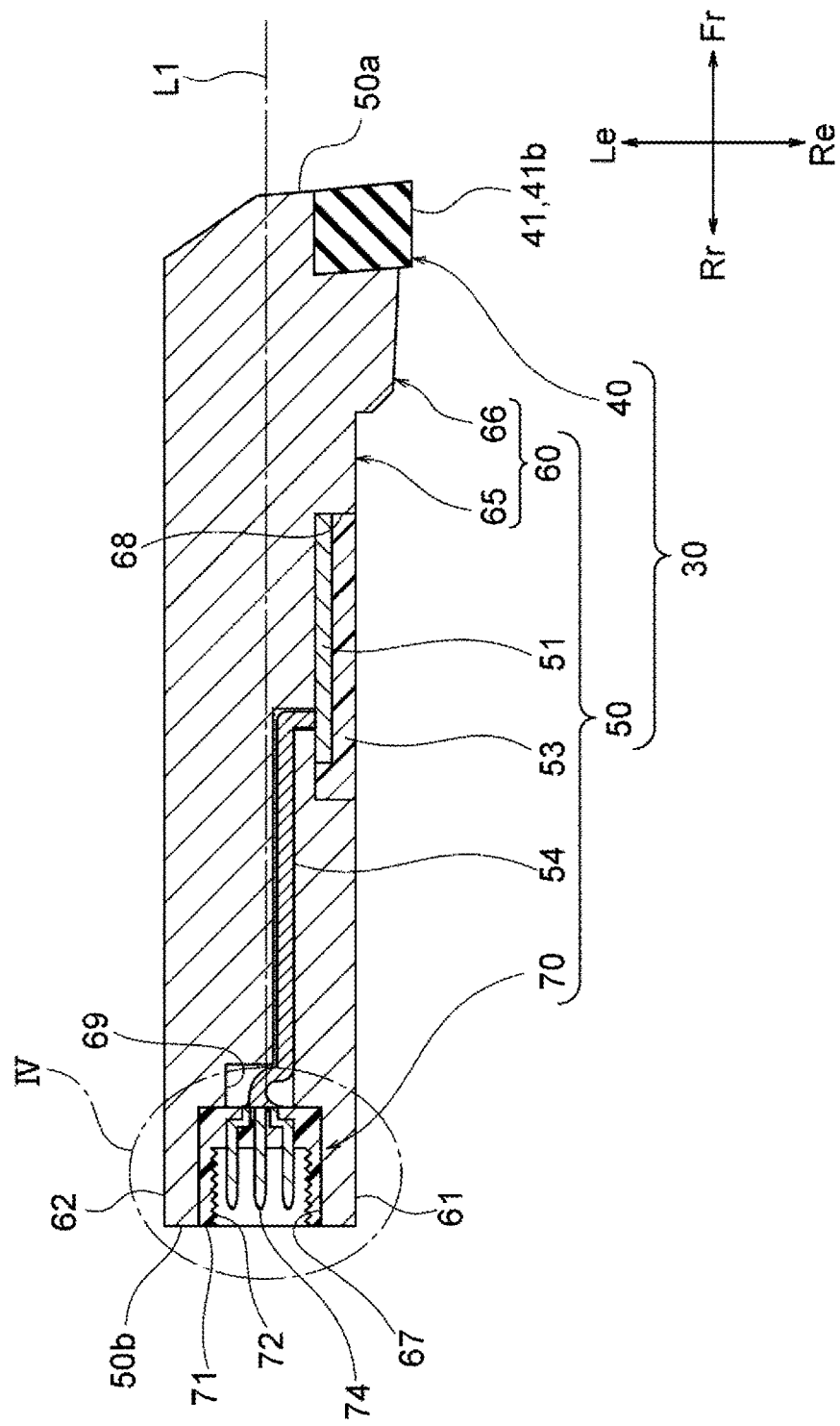
FIG. 4 is a sectional view taken along line IV-IV shown in FIG. 3.

Referring to FIG. 4, the holder 50 may have, for example, a base body 60, a sensor 51, a resin section 53, a connector 70, and wiring 54. The base body 60 may serve as a base of the holder 50 and may occupy a major portion of the holder 50. The sensor 51 may be accommodated inside the base body 60. The resin section 53 may seal the sensor 51. The connector 70 may be located inside the base body 60 and be oriented outward. The wiring 54 may connect the sensor 51 and the connector 70 in an electrifiable manner.

(Base Body Constituting Holder)

The base body 60 may be a component excluding the sensor 51, the connector 70, the resin section 53, and the wiring 54 from the holder 50. Any material may be set for the base body 60. For example, the material for the base body 60 may be steel or cast iron. From the viewpoint of increasing the flexibility of the base body 60, the material for the base body 60 may be cast iron. A description regarding the size and shape of the base body 60 will be omitted since the description is largely redundant with the description of the size and shape of the holder 50. The front end (i.e., the end at the front side) of the base body 60 may serve as the first end 50a, and the rear end (i.e., the end at the rear side) of the base body 60 may serve as the second end 50b.

Referring to FIG. 3, the base body 60 may have, for example, a first side surface 61, a second side surface 62, a third side surface 63, and a fourth side surface 64. The first side surface 61 may face the side toward which the flank face 41b of the tip 40 is oriented. The second side surface 62 may be located opposite the first side surface 61. The third side surface 63 may connect the first side surface 61 and the second side surface 62 and may face the side toward which the rake face 41a of the tip 40 is oriented. The fourth side surface 64 may be located opposite the third side surface 63. The first to fourth side surfaces 61, 62, 63, and 64 may be connected to the first end 50a and the second end 50b.

The first side surface 61 may serve as the right side surface of the base body 60. The first side surface 61 may face the side toward which the flank face 41b is oriented. In this case, the direction in which the first side surface 61 faces does not have to match the direction in which the flank face 41b is oriented. For example, the first side surface 61 may face a direction closest to the direction in which the flank face 41b is oriented among the side surfaces constituting the base body 60.

The second side surface 62 may serve as the left side surface of the base body 60. The third side surface 63 may serve as the upper surface of the base body 60. The third side surface 63 may face the side toward which the rake face 41a is oriented. In this case, the direction in which the third side surface 63 faces does not have to match the direction in which the rake face 41a is oriented. For example, the third side surface 63 may face a direction closest to the direction in which the rake face 41a is oriented among the surfaces constituting the base body 60. The fourth side surface 64 may serve as the lower surface of the base body 60.

Referring to FIG. 4, the base body 60 may be constituted of, for example, the shank section 65, the securing section 66, a depression 67, an accommodation section 68, and a passage 69. The shank section 65 may be secured to the cutter holder 20 (see FIG. 1). The securing section 66 may be secured to the front end (i.e., the end at the front side) of the shank section 65. The depression 67 may be provided at the rear end (i.e., the end at the rear side) of the shank section 65 and may receive the connector 70. The accommodation section 68 may have an opening provided in a side surface (i.e., the first side surface 61) of the shank section 65 and may accommodate the sensor 51. The passage 69 may connect the depression 67 and the accommodation section 68. The shank section 65 and the securing section 66 may be continuous with each other and be integrated with each other.

(Shank Section Constituting Base Body)

Referring to FIG. 3, for example, the shank section 65 may have a rectangular shape in cross section taken orthogonally to a straight line L1 extending in the front-rear direction. In another embodiment, the shank section 65 may have a trapezoidal shape in the cross section, or may have a circular shape in the cross section.

(Securing Section Constituting Base Body)

For example, the securing section 66 may have a tapered shape from the shank section 65 toward the first end 50a. The securing section 66 may have the cutout 66a having the tip 40 fitted therein at the front end (i.e., the first end 50a). The tip 40 fitted in the cutout 66a may be biased downward by the clamp 31, so that the tip 40 may be secured to the securing section 66.

(Depression Constituting Base Body)

Referring to FIGS. 3 and 4, for example, the depression 67 may be provided at the second end 50b and may have a certain depth from the second end 50b toward the first end 50a. The depth of the depression 67 may be, for example, ⅓ or smaller, ½, or ⅔ or smaller of the width of the shank section 65 in the left-right direction. Furthermore, the depth of the depression 67 may be equal to the width of the shank section 65 in the left-right direction, or may be larger than the width of the shank section 65 in the left-right direction.

The connector 70 may be fitted in the depression 67. The expression "fitted in" may be broadly interpreted and may include, for example, a case where the connector 70 is simply fitted, as well as a case where the connector 70 is screwed in the depression 67 that is internally threaded. With the connector 70 being fitted in the depression 67, it can be regarded that the shank section 65 includes the connector 70 in an overall view of the cutting tool 30. The depression 67 may have an inner surface with a protrusion that prevents the connector 70 from falling out, an internally-threaded inner surface into which the connector 70 that is externally threaded can be screwed, or an entirely smooth inner surface.

Figure 5:
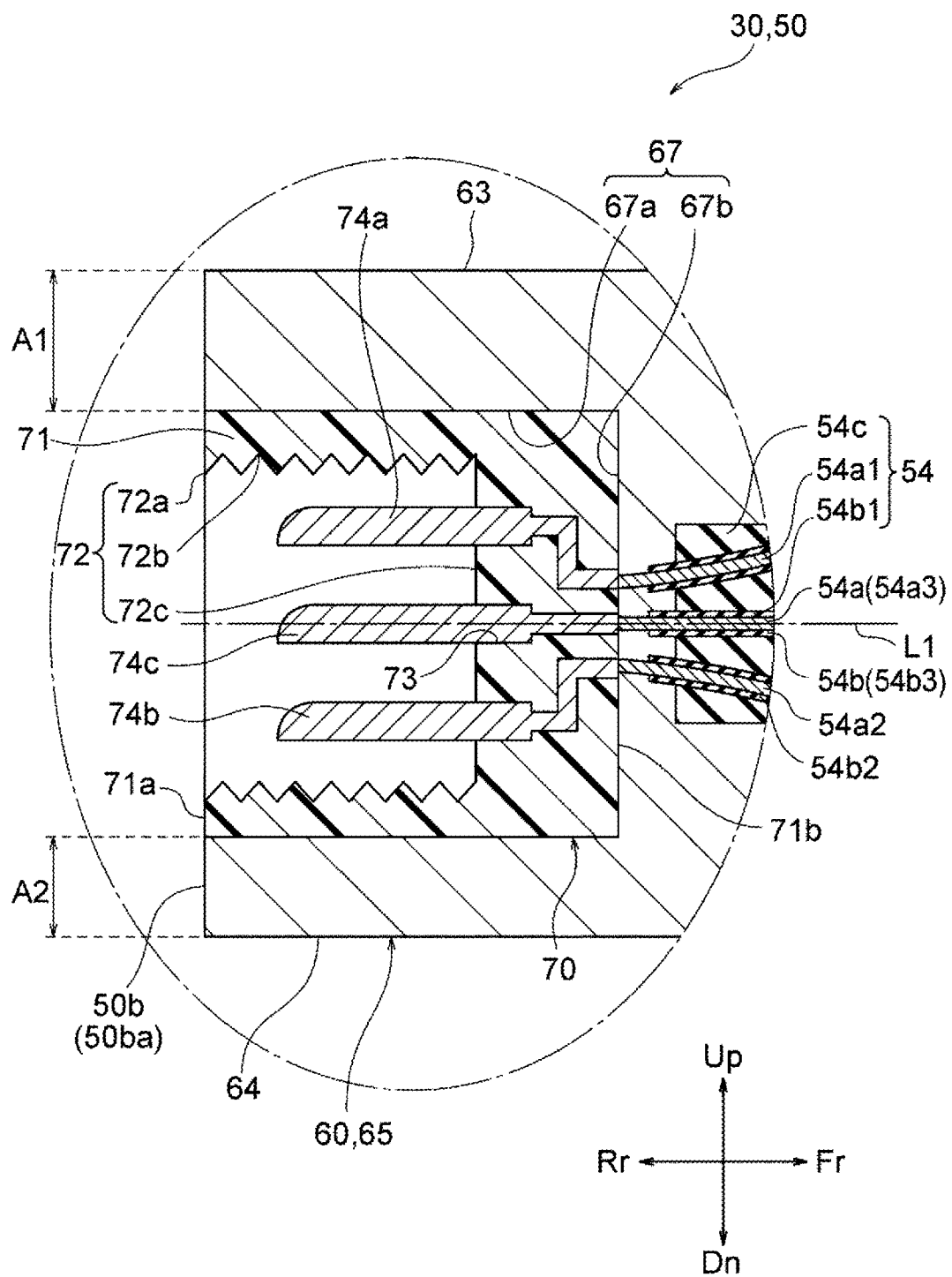
FIG. 5 is an enlarged view of a region V shown in FIG. 4.

Referring to FIG. 5, for example, the size of the depression 67 may be substantially the same as the size of the connector 70. In another example, the depression 67 may have an inner diameter that is substantially equal to the outer diameter of the connector 70, and may have a depth of more than or equal to 1.2 times or more than or equal to 1.5 times the length of the connector 70 in the front-rear direction. As in the example shown in FIG. 5, the connector 70 may be entirely located within the depression 67.

Referring to FIG. 3, the shape of the depression 67 may be appropriately set in accordance with the shape of the connector 70. For example, the depression 67 may be circular in the cross section taken orthogonally to the straight line L1 extending in the front-rear direction. In another embodiment, the depression 67 may be, for example, elliptical, rectangular, or pentagonal in the cross section taken orthogonally to the straight line L1 extending in the front-rear direction.

Referring to FIG. 5, a middle part of the depression 67 may be located toward the fourth side surface 64 relative to the third side surface 63. Assuming that, in the up-down direction, the distance from the third side surface 63 to the depression 67 may be defined as A1 and the distance from the fourth side surface 64 to the depression 67 may be defined as A2, A1 and A2 may have the relationship A1>A2. Accordingly, a middle part of a recess 72 may be located toward the fourth side surface 64 relative to the third side surface 63.

Figure 6A:
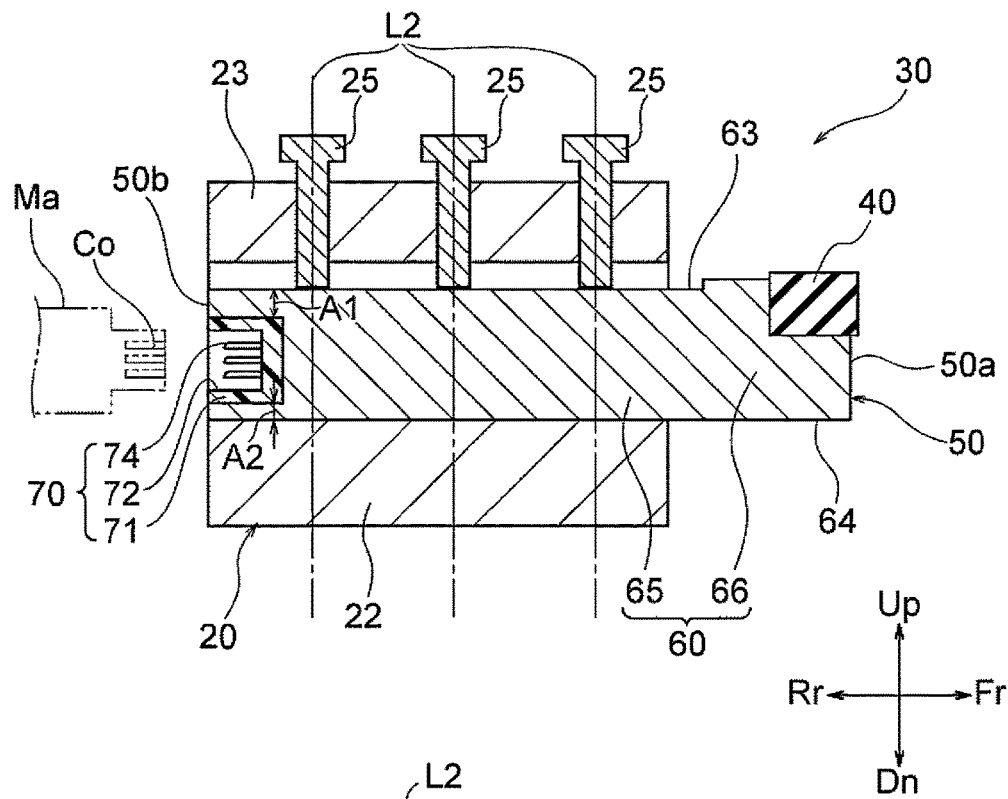
FIG. 6A is a sectional view taken along line VIa-VIa shown in FIG. 2B.
Figure 6B:
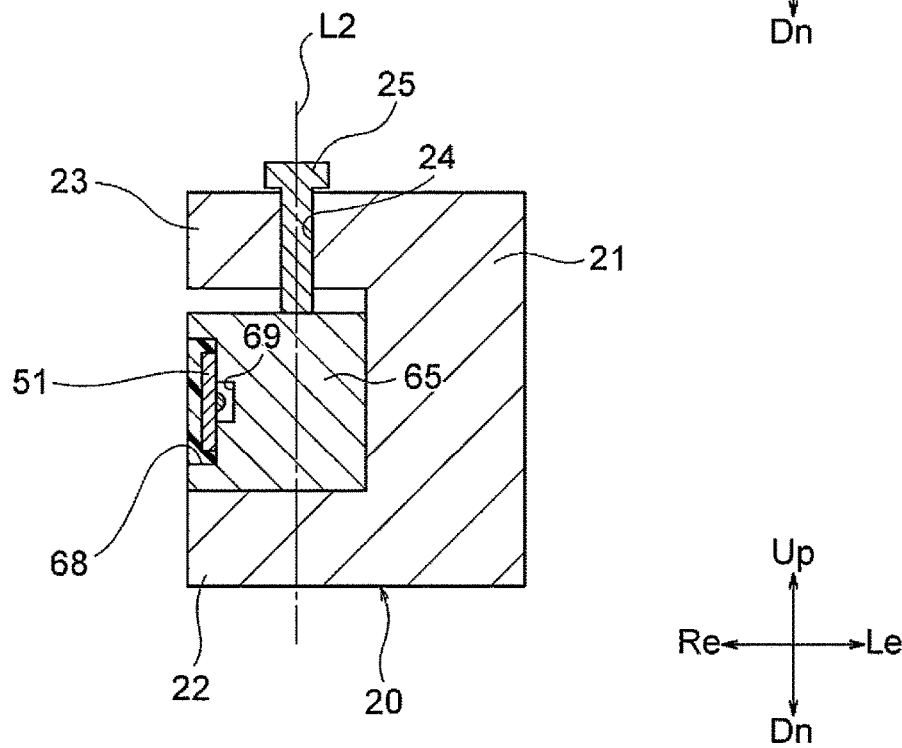
FIG. 6B is a sectional view taken along line VIb-VIb shown in FIG. 2B.

FIG. 6A may be a sectional view of the cutting tool 30 secured to the cutter holder 20, taken in the front-rear and up-down directions. FIG. 6B may be a sectional view of the cutting tool 30 secured to the cutter holder 20, taken in the up-down and left-right directions. For example, a base surface 67b (see FIG. 5) of the depression 67 (see FIG. 5) may be located toward the opening (i.e., toward the second end 50b) of the depression 67 relative to a straight line L2 extending in a direction in which the biasing sections 25 bias the shank section 65 from the center of the biasing sections 25. More specifically, the base surface 67b of the depression 67 may be located toward the opening of the depression 67 (i.e., toward the surface of the shank section 65 having the depression 67) relative to where the biasing sections 25 come into contact with the shank section 65. From a different viewpoint, the depression 67 may be located away from the straight line L2 extending in the biasing direction from the biasing area of the biasing sections 25. From the viewpoint of further increasing the durability, the area of the shank section 65 that is biased downward by the biasing sections 25 may be solid. The same may apply to the relationship between a base surface 72c of the recess 72 and the straight line L2 extending in the direction in which the biasing sections 25 bias the shank section 65 from the center of the biasing sections 25. In other words, the recess 72 (i.e., the base surface 72c of the recess 72) may be located toward the surface of the shank section 65 (i.e., toward the surface of the shank section 65 having the recess 72) relative to the straight line L2 extending in the direction in which the biasing sections 25 bias the shank section 65 from the center of the biasing sections 25.

As in the example shown in FIG. 6A, the connector 70 of the cutting tool 30 secured to the cutter holder 20 may be connected to an external device Ma. More specifically, a second connector Co that the external device Ma has may be connected to the connector 70. Accordingly, the sensor 51 may be in an electrifiable state with the external device Ma. In the present disclosure, a structure obtained by combining the cutter holder 20, the cutting tool 30, and the external device Ma may be referred to as a cutting structure 11.

Referring to FIG. 5, the depression 67 may have, for example, an inner surface 67a and the base surface 67b. The inner surface 67a may have an opening 72a at the second end 50b, and may surround the connector 70. The base surface 67b may be connected to the inner surface 67a, and may serve as the base of the depression 67. The inner surface 67a may be orthogonal to the second end 50b (in the shown example), or may be inclined at a predetermined angle relative to the second end 50b.

The surface roughness of the inner surface 67a may be greater than the surface roughness of the outer surface (e.g., the first to fourth side surfaces 61, 62, 63, and 64 (see FIG. 3)) of the base body 60. In this case, the connector 70 fitted in the inner surface 67a may be less likely to fall out. The inner surface 67a may have a protrusion (not shown) that protrudes toward the center of the depression 67. Such a protrusion may contribute to a reduced probability of the connector 70 falling out of the depression 67. In addition to the above, the inner surface 67a may have various structures for reducing the probability of the connector 70 falling out of the depression 67.

The base surface 67b may be orthogonal to the inner surface 67a. From a different viewpoint, the base surface 67b may be parallel to the second end 50b. The base surface 67b may be inclined at a predetermined angle relative to the second end 50b. For example, the surface roughness of the base surface 67b may be greater than the surface roughness of the outer surface of the base body 60. For example, in a case where the connector 70 is adhered to the base surface 67b (i.e., the shank section 65) by using a bonding material interposed between the base surface 67b and the connector 70, the bonding force of the bonding material against the base surface 67b can be increased.

(Accommodation Section Constituting Base Body)

Referring to FIG. 4, for example, the accommodation section 68 may have an opening in the first side surface 61 and may have a certain depth toward the second side surface 62. The accommodation section 68 may accommodate the sensor 51 therein. The shape of the accommodation section 68 may be appropriately set in accordance with the shape of the sensor 51. For example, the accommodation section 68 may be rectangular in a side view from the first side surface 61. In another embodiment, the accommodation section 68 may be, for example, elliptical, circular, or trapezoidal in the side view from the first side surface 61. Referring also to FIG. 3, the accommodation section 68 may be filled with the resin section 53.

The size (i.e., the lengths in the up-down direction, the left-right direction and the front-rear direction) of the accommodation section 68 may be appropriately set in accordance with the size of the sensor 51. The height (i.e., the length in the up-down direction) of the accommodation section 68 may be smaller than the height of the sensor 51, the depth (i.e., the length in the left-right direction) of the accommodation section 68 may be smaller than the thickness of the sensor 51, and the width (i.e., the length in the front-rear direction) of the accommodation section 68 may be smaller than the width of the sensor 51. For example, the size (i.e., the height, depth, and width) of the accommodation section 68 may be more than or equal to 1.1 times, more than or equal to 1.3 times, or more than or equal to 1.5 times the size of the sensor 51. If the size (i.e., the height, depth, and width) of the accommodation section 68 is larger than the size (i.e., the height, depth, and width) of the sensor 51, the sensor 51 can be readily accommodated in the accommodation section 68.

For example, with regard to the positional relationship between the front side (toward the first end 50*a*) and the rear side (toward the second end 50*b*) of the shank section 65, the accommodation section 68 may be relatively located toward the front side of the shank section 65. Alternatively, in another embodiment, with regard to the positional relationship between the front side and the rear side of the shank section 65, the accommodation section 68 may be relatively located toward the rear side of the shank section 65.

(Passage Constituting Base Body)

The passage 69 may be a through-hole extending from the depression 67 to the accommodation section 68 and may have the wiring 54 extending therethrough. The wiring 54 may connect the sensor 51 and the connector 70 in an electrifiable manner. In the cross section of the shank section 65 taken orthogonally to the straight line L1 extending in the front-rear direction, the shape of the passage 69 may be, for example, circular. Referring also to FIG. 6B, for example, the passage 69 may be located away from the straight line L2 extending downward from where the shank section 65 is biased by the biasing sections 25. In other words, the passage 69 may be located distant from the straight line L2.

(Sensor Constituting Holder)

The sensor 51 may be, for example, a device capable of detecting the state of the cutting tool 30 during a cutting process. Examples of the state of the cutting tool 30 detectable by the sensor 51 may include physical values, such as the temperature, acceleration, vibration, distortion, and internal stress, in the cutting tool 30 during a cutting process, and a physical value, such as wear, in the cutting tool 30. State detection may refer to detection of at least one or more of the physical values with respect to the cutting tool 30. A detection target is not limited to a physical value in a static state in which there is relatively no change in the state, and may include, for example, a dynamic physical value that involves a change in the state. The static state and the dynamic state will be described in further detail below.

In a case where the physical value to be detected by the sensor 51 is the temperature of the cutting tool 30 (i.e., the base body 60), for example, it may be assumed that, by cutting the object Ob (see FIG. 1), the temperature of the base body 60 at 20° C. prior to the cutting process increases to 80° C. during the cutting process. In this case, the temperature of the base body 60 at 20° C. prior to the cutting process may correspond to a static physical value, and the amount of change in the temperature of the base body 60 from 20° C. to 80° C. in accordance with the cutting process may correspond to a dynamic physical value. For example, the sensor 51 may detect at least one of the static physical value and the dynamic physical value. Information related to the cutting tool 30 to be detected by the sensor 51 is not limited to the temperature, acceleration, vibration, internal stress, and wear.

In one embodiment, the sensor 51 may include a thermocouple. In this case, for example, the sensor 51 may be capable of detecting a physical value related to the temperature of gas. In one embodiment, the sensor 51 may include a piezoelectric sensor having a piezoelectric element. In this case, for example, the sensor 51 may be capable of detecting a physical value related to acceleration, vibration, distortion, and/or internal stress in the base body 60. The sensor 51 according to the present disclosure may be, for example, a simple wiring circuit. In a case where the sensor 51 is a simple wiring circuit, a target to be detected by the sensor 51 may be, for example, the degree of wear in the cutting tool 30. More specifically, by ascertaining a resistance value that changes in accordance with the degree of wear in the wiring circuit (i.e., the sensor 51), information related to the state of the cutting tool 30 can be obtained.

There may be various types of sensors 51. The sensor 51 may be of any type so long as it is capable of detecting the physical value, and is not limited to the thermocouple, the piezoelectric sensor, the wiring circuit, and the like member mentioned above. One example of the sensor 51 other than the types may be a MEMS sensor. The sensor 51 may be constituted of a transducer alone (i.e., a narrowly-defined sensor) that converts a physical value into an electric signal. Furthermore, the sensor 51 may include an amplifier in addition to a transducer that converts a physical value into an electric signal. Referring also to FIG. 6A, the information about the physical value detected by the sensor 51 may be input to, for example, the external device Ma (e.g., a device capable of inputting the information to the information processing device 12 (see FIG. 1)) via the wiring 54 and the connector 70. In one embodiment, the external device Ma may be connected to the information processing device 12 in a wired manner, and the information containing the physical value detected by the sensor 51 may be input to the information processing device 12. In one embodiment, the external device Ma may input the information containing the physical value detected by the sensor 51 to the information processing device 12 by wireless communication. The cutting tool 30 with the external device Ma fitted in the depression 67 may serve as a cutting tool unit.

Referring to FIG. 3, the sensor 51 may be set to have any shape. For example, the sensor 51 may have a tabular shape. The tabular-shaped sensor 51 may be, for example, rectangular in side view. Alternatively, in another embodiment, the tabular-shaped sensor 51 may be circular, ellipsoidal, or trapezoidal in side view. The sensor 51 is not limited to being tabular-shaped and may be, for example, rod-shaped. The sensor 51 may be set to have any thickness. For example, the thickness of the sensor 51 may be 1 mm or more, or may be 2 mm or more.

Referring to FIGS. 3 and 4, the position where the sensor 51 is located may be set in accordance with the location where the accommodation section 68 is disposed in the shank section 65. For example, the sensor 51 may be located toward the front side in the shank section 65. In this case, for example, the sensor 51 can readily detect the physical value related to the state of the cutting tool 30, as compared with a case where the sensor 51 is disposed toward the rear side of the shank section 65. Alternatively, in another embodiment, the sensor 51 may be located toward the rear side in the shank section 65. In this case, the sensor 51 may be located away from the tip 40 that cuts the object Ob (see FIG. 1), as compared with the case where the sensor 51 is disposed toward the front side of the shank section 65. As a result, heat and vibration occurring during a cutting process may be less likely to be transmitted to the sensor 51, so that the load applied to the sensor 51 can be further reduced. The sensor 51 can be disposed at an optimal location from the viewpoint of, for example, the physical value detected by the sensor 51 and the durability of the sensor 51.

The sensor 51 may be bonded to the base body 60 by using, for example, a bonding material. The bonding material may be an adhesive composed of an organic material or an inorganic material. The bonding material may have electrical conductivity or does not have to have electrical conductivity.

(Resin Section Constituting Holder)

The material for the resin section 53 may be, for example, acrylic resin. As in the example shown in FIG. 4, the resin section 53 may be entirely located within the accommodation section 68 and does not have to have a part located outward from the first side surface 61. In this case, when the tip 40 is pressed onto the object Ob in a state where the cutting tool 30 is attached to the machine tool Mt (see FIG. 1), the resin section 53 may be less likely to come into contact with the object Ob. As a result, the resin section 53 may be less likely to come close to the object Ob during a cutting process. Alternatively, in another embodiment, the resin section 53 may include a part located outward from the first side surface 61.

The holder 50 may have a cover located on the resin section 53. In other words, the sensor 51 and the resin section 53 may be located in a region surrounded by the accommodation section 68 and the cover. In a case where the cover is a metal member with high heat resistance and high oil resistance, such as a stainless steel member, the durability of the holder 50 may be high, as compared with a case where the resin section 53 is exposed to the outside.

(Connector Constituting Holder)

Figure 7:
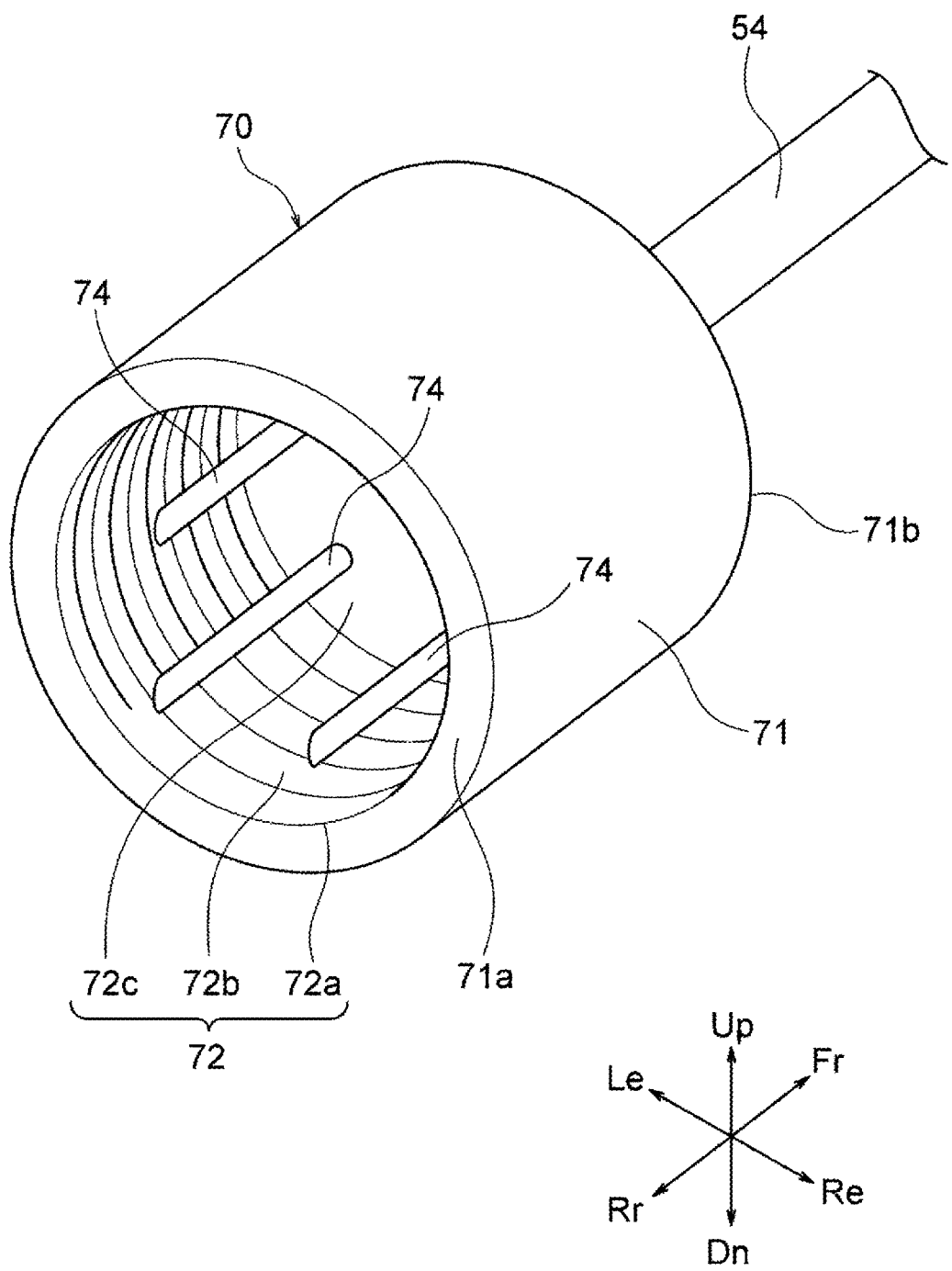
FIG. 7 is an enlarged view of a connector and a terminal shown in FIGS. 2A and 2B.

Referring to FIGS. 5 and 7, the connector 70 may be a component connectable to the external device Ma (see FIGS. 6A and 6B). For example, the connector 70 may be entirely located within the depression 67 provided in the base body 60. In a case where the connector 70 is located within the depression 67 provided in the base body 60, it can be regarded that the connector 70 is included in the shank section 65 in an overall view of the cutting tool 30.

For example, the size of the connector 70 may be substantially the same as the size of the depression 67. Alternatively, in another embodiment, the connector 70 may be smaller than the depression 67 or may be larger than the depression 67. In a case where the connector 70 is smaller than the depression 67, the length of the connector 70 in the front-rear direction may be ¾ or smaller, ½ or smaller, or ¼ or smaller of the depth of the depression 67. The length of the connector 70 in the front-rear direction may be ¾ or larger of the depth of the depression 67.

The connector 70 may be set to have any shape in accordance with the shape of the depression 67. For example, the connector 70 may have a circular columnar shape. Alternatively, in another embodiment, the connector 70 together with the depression 67 may have a rectangular columnar shape or a pentagonal columnar shape. In a case where the inner surface of the depression 67 is internally threaded, the connector 70 may be externally threaded so as to be screwable into the internally-threaded depression 67. Even in a case where the inner surface of the depression 67 is not internally threaded, a protrusion that prevents the connector 70 from falling out of the depression 67 may protrude from the outer surface of the connector 70. The outer surface (i.e., a main body 71 to be described below) of the connector 70 may be, for example, an insulator. An example of the insulator may be an organic material (e.g., resin), an inorganic material (e.g., ceramic), or the like.

As in the example shown in FIG. 5, the connector 70 may have the main body 71, the recess 72, a second through-hole 73, and a terminal 74. The recess 72 may be provided at an end 71a (also referred to as one end 71a hereinafter) of the main body 71. The second through-hole 73 may be provided in the base surface of the recess 72. The terminal 74 may at least partially be oriented outward from the second through-hole 73.

(Recess Constituting Connector)

The recess 72 may extend from the one end 71a of the main body 71 toward the opposite end (also referred to as the other end 71b hereinafter). The recess 72 may be recessed relative to the outer surface (i.e., a rear end surface 50ba) of the shank section 65. The recess 72 may be set to have any depth in accordance with the external device Ma (see FIG. 6A). For example, the depth of the recess 72 may be ¼ or smaller, ½ or smaller, or ¾ or smaller of the length of the connector 70 from the one end 71a to the other end 71b. As in the example shown in FIG. 5, the main body 71 may be provided with the second through-hole 73 extending in the front-rear direction. The terminal 74 may be fitted (i.e., embedded) in the second through-hole 73 and may have a front end oriented outward. The opening 72a provided at the one end 71a of the main body 71 may be oriented outward from the rear end 50b of the shank section 65.

The recess 72 may have an inner wall 72b and the base surface 72c. The inner wall 72b may extend from the opening of the connector 70 toward the base of the recess 72. The base surface 72c may connect to the inner wall 72b and may serve as the base of the recess 72.

As in the example shown in FIG. 5, the inner wall 72b may have an internally-threaded area. Alternatively, in another embodiment, the inner wall 72b does not have to have an internally-threaded area. The inner wall 72b may be parallel to the straight line L1 extending from the first end 50a to the second end 50b (see FIG. 3), or may be inclined at a predetermined angle relative to the straight line L1.

(Terminal Constituting Connector)

The terminal 74 may include a conductor and may be a part to be connected to the external device Ma. As in the example shown in FIG. 5, the terminal 74 may have a length from the rear end to the front end, may have the rear end connected to the wiring 54, and may have at least a part thereof (i.e., the front end) exposed to the outside from the recess 72. Specifically, the terminal 74 may include a part at least partially connectable to the outside within the recess 72. The front end of the terminal 74 may be entirely located within the recess 72. Furthermore, the front end of the terminal 74 may be oriented rearward from the recess 72. The rear end of the terminal 74 may be embedded in the main body 71. In this case, the terminal 74 may be fixed to the connector 70. The terminal 74 may have, at the rear end, for example, a part that is bent. Alternatively, in another embodiment, the terminal 74 may extend straight from the front end toward the rear end. The terminal 74 may be composed of, for example, iron, copper, or an alloy having these elements as components.

Referring to FIG. 3, the holder 50 may be set to have any number of terminals 74. In the embodiment shown in FIG. 3, the holder 50 may have three terminals 74. In another embodiment, the holder 50 may have a single terminal 74 alone, two terminals 74, or four or more terminals 74. The terminal 74 may be connected to the external device Ma (see FIGS. 6A and 6B). In this case, for example, the information containing the physical value detected by the sensor 51 may be inputtable to the information processing device 12 via the external device Ma.

(Wiring Constituting Holder)

Referring to FIG. 4, with regard to the wiring 54 located within the passage 69, the end toward the first end 50a may be connected to the sensor 51 and the end toward the second end 50b may be connected to the terminal 74. Referring to FIG. 5, the wiring 54 may have a plurality of conductors 54a, a plurality of insulators 54b, and a binder 54c. For example, a plurality of conductors 54a1, 54a2, and 54a3 may be connected to a plurality of terminals 74a, 74b, and 74c. A plurality of insulators 54b1, 54b2, and 54b3 may cover the plurality of conductors 54a1, 54a2, and 54a3. The binder 54c may bind the plurality of insulators 54b1, 54b2, and 54b3 together.

The conductors 54a may be composed of, for example, iron, copper, or an alloy having these elements as components. The insulators 54b may be insulative members composed of, for example, rubber. The insulators 54b may cover the outer surfaces of the conductors 54a1, 54a2, and 54a3 to prevent the plurality of conductors 54a1, 54a2, and 54a3 from coming into contact with each other. The binder 54c may be an insulative member composed of, for example, rubber.

(Information Processing Device)

Referring to FIGS. 1 and 4, for example, the physical value detected by the sensor 51 may be input to the information processing device 12 via the external device Ma (see FIG. 6A). As mentioned above, for example, the external device Ma may be fitted in the depression 67 provided in the cutting tool 30 and may input the physical value detected by the sensor 51 to the information processing device 12 by wired or wireless communication. For example, the information processing device 12 may be set in the machine tool Mt or may be disposed in a space surrounding the machine tool Mt. Furthermore, the information processing device 12 may be disposed away from the machine tool Mt.

The information processing device 12 may include, for example, a computer. The computer may include a central processing unit (CPU), a random access memory (RAM), a read only memory (ROM), and an external storage device. A program stored in the ROM and/or the external storage device may be executed by the CPU, so that an information processor 12a can exhibit various functions.

Figure 8:
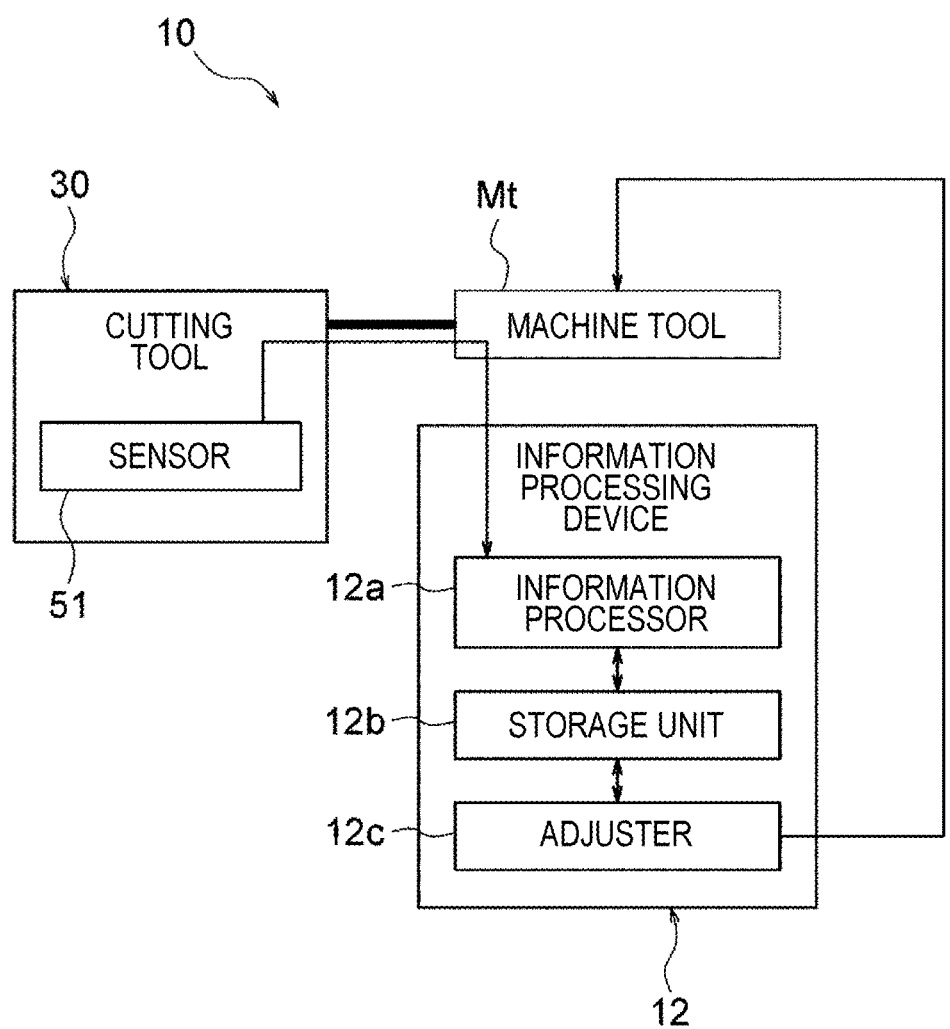
FIG. 8 is a block diagram illustrating the configuration of a data collection system according to an embodiment.

Referring to FIG. 8, the information processing device 12 may include, for example, the information processor 12a, a storage unit 12b, and an adjuster 12c. The information processor 12a may be where the information about the physical value detected by the sensor 51 is processed. The storage unit 12b may be where the information processed by the information processor 12a is stored. The adjuster 12c may be where control of the machine tool Mt is adjusted based on the information processed by the information processor 12a.

For example, the information processor 12a may perform a process for accumulating the information about the physical value detected by the sensor 51 in the storage unit 12b. The information accumulated by the information processor 12a may be information about the physical value directly detected by the sensor 51 or may be information different from the information about the physical value detected by the sensor 51 (e.g., information obtained as a result of executing a program based on the information about the physical value detected by the sensor 51).

For example, the adjuster 12c may adjust a parameter value of the program in the machine tool Mt by using the information accumulated in the storage unit 12b. In one embodiment, the adjuster 12c may adjust a parameter value of the program to change the rotational speed of the object Ob. In one embodiment, the adjuster 12c may adjust a parameter value of the program to change the moving speed of the cutting tool 30 moving in the front-rear, left-right, and up-down directions.

A single information processing device 12 may be connected to a plurality of machine tools Mt. In this case, the single information processor 12a may process information about physical values detected by the plurality of sensors 51. The single storage unit 12b may store the information containing the physical values detected by the plurality of sensors 51. Furthermore, the single adjuster 12c may adjust the programs in the plurality of machine tools Mt by using the information containing the physical values detected by the plurality of sensors 51. For example, the single information processing device 12 may collect big data obtained from the plurality of machine tools Mt.

Referring to FIG. 4, the sensor 51 may be accommodated inside the shank section 65. Accordingly, chips and the like occurring as a result of a cutting process may be less likely to come into contact with the sensor 51. Moreover, the sensor 51 may be less likely to be exposed to oil or the like used during a cutting process. As a result, the load on the sensor 51 can be reduced. In other words, the cutting tool 30 having the sensor 51 may have high durability.

The connector 70 may have the recess 72 recessed relative to the outer surface of the shank section 65. Furthermore, the connector 70 may have the terminal 74 exposed within the recess 72 and electrically connected to the sensor 51. Accordingly, for example, when the cutting tool 30 is connected to the external device Ma, the connection section of the external device Ma can be located within the recess 72. As a result, when the cutting tool 30 and the external device Ma are connected to each other, the terminal 74 may be less likely to be exposed to the outside. Consequently, for example, oil or the like may be less likely to adhere to the terminal 74 during a cutting process. In other words, the durability of the cutting tool 30 can be further enhanced.

The shank section 65 may have the depression 67 provided in the outer surface, and the connector 70 may be entirely located within the depression 67. In this case, when the cutting tool 30 is connected to the external device, the connector 70 may be less likely to be exposed to the outside. Therefore, for example, oil or the like may be less likely to adhere to the connector 70 during a cutting process. As a result, a cutting tool 30 with higher durability can be provided.

Referring to FIGS. 4 and 5, the recess 72 may be recessed relative to the rear end surface of the shank section 65. In this case, the terminal 74 may be oriented rearward from the recess 72 located at the rear end of the shank section 65. As a result, the external device connected to the terminal 74 can be disposed opposite from where the tip 40 is located in the cutting tool 30. Accordingly, the terminal 74 can be disposed away from where chips occur and where oil is fed during a cutting process. In other words, the durability of the cutting tool 30 can be further enhanced.

The terminal 74 may be oriented rearward from the rear end of the shank section 65. In this case, for example, even when the cutting tool 30 is moved forward or rearward to change the distance between the cutting tool 30 and the object Ob, the connection between the external device Ma and the cutting tool 30 can be readily maintained.

In a planar perspective view from the third side surface 63 toward the fourth side surface 64, a middle part of the recess 72 (i.e., the depression 67) may be located toward the second side surface 62 relative to an intermediate position between the first side surface 61 and the second side surface 62. In this case, for example, the recess 72 can be readily disposed away from the object Ob. As a result, the terminal 74 can be readily protected from cutting oil or the like fed to the object Ob.

The middle part of the recess 72 (i.e., the depression 67) may be located toward the fourth side surface 64 relative to an intermediate position between the third side surface 63 and the fourth side surface 64. In this case, the thickness of the shank section 65 located directly above the recess 72 may tend to increase. As a result, in a case where the cutter holder 20 that secures the cutting tool 30 by biasing the shank section 65 from the third side surface 63 toward the fourth side surface 64 is used, the strength of the area biased by the cutter holder 20 can be increased. Accordingly, the durability of the cutting tool 30 may be enhanced.

Referring to FIGS. 3 and 4, the depth of the recess 72 may be ½ or smaller of the thickness of the shank section 65 in the depth direction of the recess 72. In this case, the durability of the cutting tool 30 may be enhanced.

Referring to FIGS. 6A and 6B, the cutting structure 11 may have the cutting tool 30, the cutter holder 20 to which the cutting tool 30 is secured, and the second connector Co connected to the connector 70. In this case, the durability of the cutting structure 11 may be enhanced.

The recess 72 (i.e., the base surface 72c of the recess 72) may be located away from the straight line L2 extending in the direction in which the biasing sections 25 bias the shank section 65 from the center of the biasing sections 25. In this case, the strength of the area in the cutting tool 30 biased by the cutter holder 20 can be increased. As a result, the durability of the cutting tool 30 may be enhanced.

Referring to FIG. 8, the data collection system 10 may have the cutting structure 11 and the storage unit 12b. The storage unit 12b may accumulate the information containing the physical value detected by the sensor 51 via the connector 70 and the second connector Co. The data collection system 10 may be capable of storing the information related to the cutting tool 30 detected by the sensor 51.

[Modification of Cutting Tool]

Figure 9A:
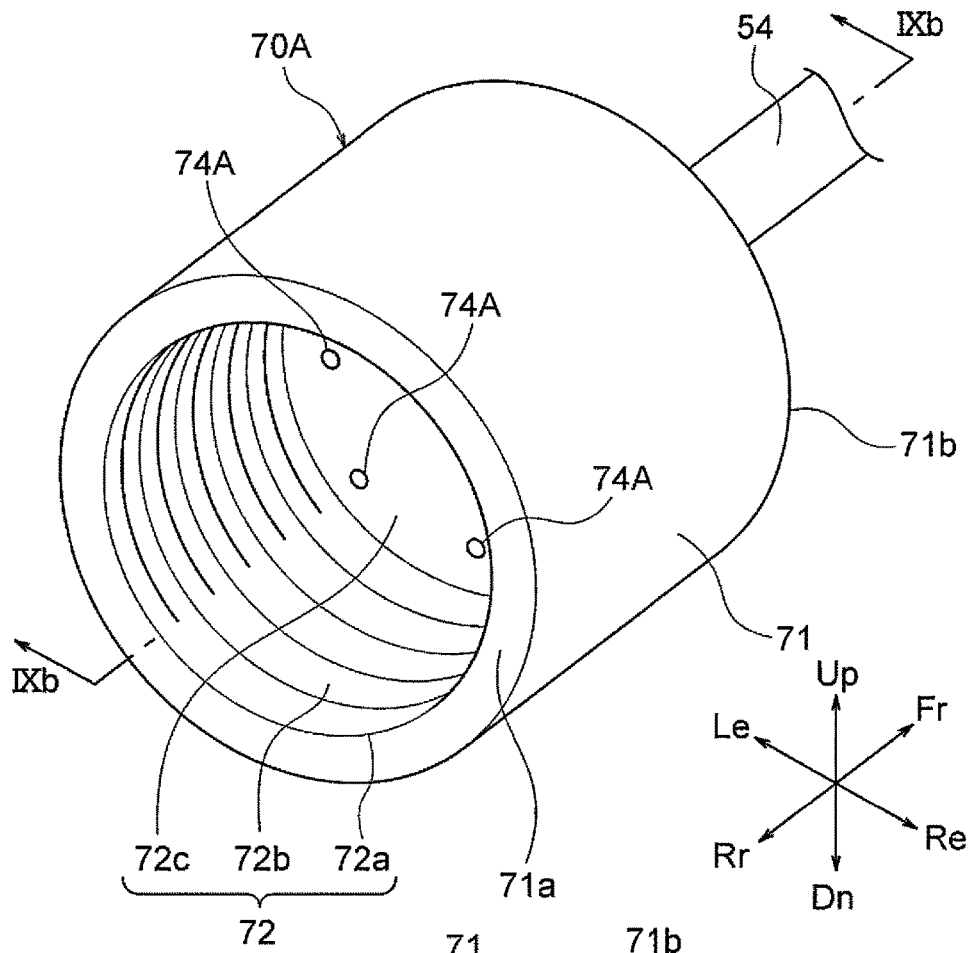
FIG. 9A and FIG. 9B illustrate a modification of the connector and the terminal shown in FIGS. 2A and 2B.
Figure 9B:
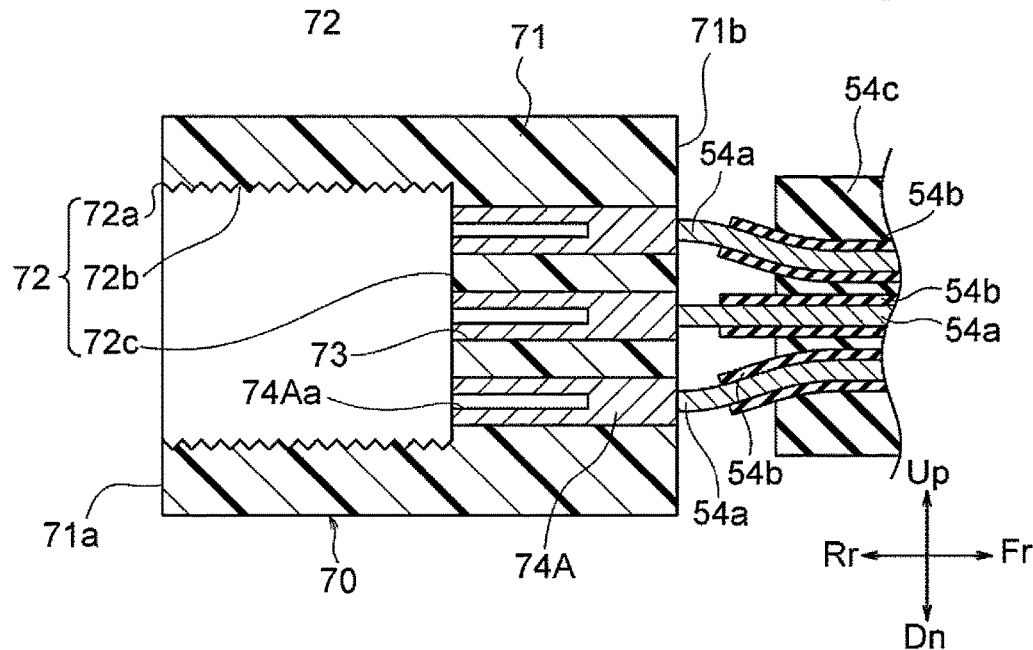

FIG. 9A may illustrate a connector 70A of a cutting tool according to a modification of the present disclosure. FIG. 9B may be a sectional view of the connector 70A shown in FIG. 9A, taken along line IXb-IXb. FIG. 9A may correspond to FIG. 7. The cutting tool according to the modification may be different from the embodiment in that the front end of a terminal 74A is embedded within the connector 70A and the terminal 74A has an insertion hole 74Aa at the front end. Other basic structures may be identical to those of the cutting tool 30 according to the embodiment. Parts identical to those in the embodiment will be given the same reference signs, and detailed descriptions thereof will be omitted.

(Terminal)

For example, the terminal 74A may be entirely located within the second through-hole 73 provided in the connector 70A. The front end (i.e., the recess 72 side) of the terminal 74A may be oriented outward from the second through-hole 73. Referring also to FIG. 3, the front end of the terminal 74A may be oriented rearward from the recess 72 located at the rear end 50b of the shank section 65. The rear end of the terminal 74A may be connected to the wiring 54.

The terminal 74A may extend in the front-rear direction and may have a length from the front end to the rear end. The front end of the terminal 74A may have the insertion hole 74Aa into which a conductor of the external device Ma (see FIG. 6A) may be insertable. It may be regarded that the terminal 74A includes a segment at least partially connectable to the outside within the recess 72. In this case, the information about the physical value detected by the sensor 51 may be input to the information processing device 12. The insertion hole 74Aa may be a hole provided at the front end of the terminal 74A and extending toward the rear end of the terminal 74A.

The connector 70A may be set to have any number of terminals 74A. For example, the number of terminals 74A may be five or more, three or more, two, or only one.

Second Embodiment

Figure 10:
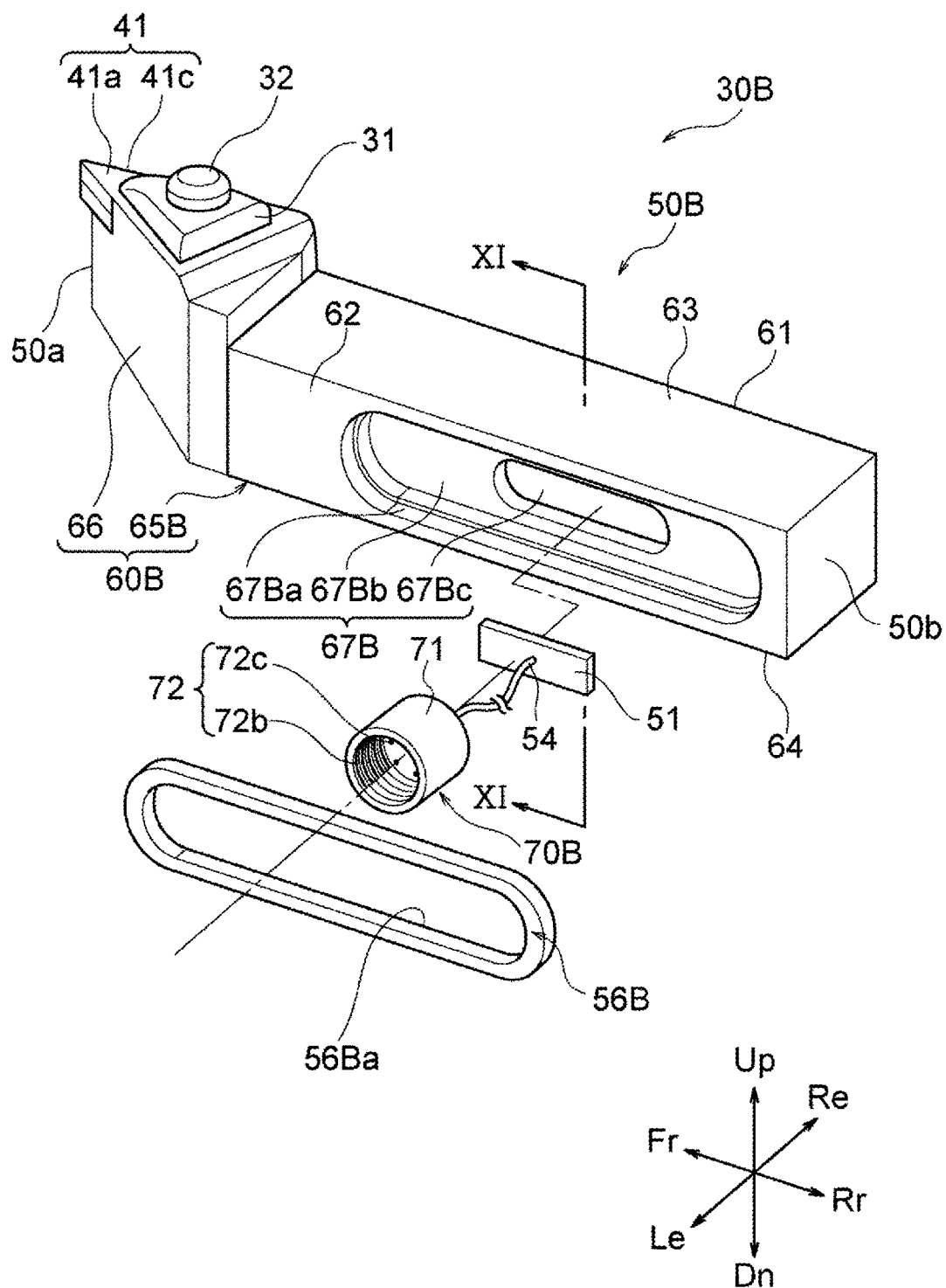
FIG. 10 is a perspective view of a cutting tool according to a second embodiment.

The following description will be provided with reference to FIGS. 10 and 11. FIG. 10 may illustrate a cutting tool 30B according to a second embodiment of the present disclosure. The cutting tool 30B according to the second embodiment may be illustrated in correspondence with FIG. 3. The cutting tool 30B may be mainly different from that in the first embodiment in that a connector 70B is fitted in a depression 67B provided in a side surface of a base body 60B, the connector 70B is supported in a movable manner in the longitudinal direction of a shank section 65B, and the depression 67B also functions as an accommodation section for accommodating the sensor 51. Other specific structures may be identical to those of the cutting tool 30 according to the first embodiment. Parts identical to those in the first embodiment will be given the same reference signs, and detailed descriptions thereof will be omitted.

(Holder)

A holder 50B may have, for example, the base body 60B, the sensor 51, the connector 70B, and a cover 56B. The connector 70B may be located inside the base body 60B together with the sensor 51. The connector 70B may have a terminal 74B. The terminal 74B may be fixed to the main body of the connector 70B and may have its front end oriented outward. The wiring 54 may connect the sensor 51 and the terminal 74B in an electrifiable manner. The cover 56B may cover the sensor 51, the connector 70B (i.e., the terminal 74B), and the wiring 54.

(Base Body Constituting Holder)

The base body 60B may have, for example, the shank section 65B, the securing section 66, and the depression 67B. The shank section 65B may serve as a major portion of the base body 60B. The securing section 66 may be secured to the front end (i.e., the end at the front side) of the shank section 65B. The depression 67B may be provided in a side surface (i.e., the second side surface 62) of the shank section 65B.

Referring to FIG. 10, for example, the sensor 51, the connector 70B (i.e., the terminal 74B), and the wiring 54 may be accommodated within the depression 67B. As viewed in a direction extending from the rear end (i.e., the second end 50b) toward the front end of the shank section 65B, the depression 67B may have a certain length. The length of the depression 67B in the front-rear direction may be larger than the width (i.e., the length in the up-down direction) of the depression 67B. The length of the depression 67B in the front-rear direction may be, for example, more than or equal to 1.5 times, more than or equal to 2 times, more than or equal to 3 times, or more than or equal to 4 times the width of the depression 67B.

As in the example shown in FIG. 11, the depression 67B may have a first depression 67Ba, a second depression 67Bb, and a third depression 67Bc. The first depression 67Ba may be provided in the second side surface 62 and may have a base. The second depression 67Bb may be provided at the base of the first depression 67Ba and may have a base. The third depression 67Bc may be provided at the base of the second depression 67Bb and may include the base of the depression 67B. The first depression 67Ba, the second depression 67Bb, and the third depression 67Bc may be connected in that order from the first side surface 61 toward the second side surface 62.

As in the example shown in FIG. 10, the length of the first depression 67Ba in the front-rear direction may be larger than the width of the first depression 67Ba. The cover 56B secured to the shank section 65B by a bonding material may be located within the first depression 67Ba. A description of the bonding material will be omitted since the description is largely redundant with the description provided in the first embodiment.

The length of the second depression 67Bb in the front-rear direction may be larger than the width of the second depression 67Bb. The connector 70B supported in a movable manner in the front-rear direction may be located within the second depression 67Bb. The length of the second depression 67Bb in the front-rear direction may be larger than the outer diameter of the connector 70B such that the connector 70B is movable in the front-rear direction. The length of the second depression 67Bb in the front-rear direction may be more than or equal to 1.5 times, more than or equal to 2 times, more than or equal to 3 times, or more than or equal to 5 times the outer diameter of the connector 70B.

The length of the third depression 67Bc in the front-rear direction may be larger than the width of the third depression 67Bc. The sensor 51 secured to the shank section 65B by a bonding material may be located within the third depression 67Bc. A description of the bonding material will be omitted since the description is largely redundant with the description provided in the first embodiment.

(Connector)

The connector 70B may be supported in a movable manner in the longitudinal direction (i.e., the front-rear direction) of the shank section 65B. As in the example shown in FIG. 11, the thickness (i.e., the length in the left-right direction) of the connector 70B may be smaller than the depth of the second depression 67Bb. In FIG. 10, the thickness of the connector 70B may be shown to be larger than the depth of the depression 67B for the sake of illustrating the inner wall 72b of the connector 70B similarly to that in FIG. 3. The outer diameter of the connector 70B may be smaller than the width (i.e., the length in the up-down direction) of the second depression 67Bb. Furthermore, in a case where the length of the second depression 67Bb in the front-rear direction is larger than the outer diameter of the connector 70B, the connector 70B can be moved in the front-rear direction. The connector 70B movable in this manner may be prevented from falling out of the second depression 67Bb by the cover 56B. FIG. 10 may merely illustrate one example where the connector 70B is supported in a movable manner, and the configuration for supporting the connector 70B in a movable manner in the front-rear direction is not limited to this. As in the example shown in FIG. 11, the connector 70B may be entirely located within the second depression 67Bb.

As in the example shown in FIG. 10, in the second depression 67Bb, the recess 72 (i.e., the one end 71a) of the connector 70B may be oriented outward, and the other end 71b of the connector 70B may be oriented toward the sensor 51. The recess 72 of the connector 70B may be recessed relative to a side surface (i.e., the second side surface 62) of the shank section 65. The connector 70B may have the second through-hole 73 provided at the base of the recess 72 and at the other end 71b of the connector 70B. The terminal 74B may be located within the second through-hole 73.

(Terminal Constituting Connector)

As in the example shown in FIG. 11, the terminal 74B may be entirely located within the second through-hole 73 provided in the connector 70B. In a state where the front end of the terminal 74B is located within the second through-hole 73, the front end of the terminal 74B may be oriented outward from the recess 72 located in the second side surface 62 (i.e., front surface) of the shank section 65B. The rear end of the terminal 74B may be connected to the wiring 54.

The front end of the terminal 74B may have an insertion hole 74Ba into which the external device Ma (see FIG. 6A) is insertable. The insertion hole 74Ba may be a hole provided at the front end of the terminal 74B and extending toward the rear end of the terminal 74B. A conductor of the external device Ma may be insertable into the insertion hole 74Aa. In other words, the terminal 74B may include a part at least partially connectable to the outside within the recess 72.

(Cover)

As in the example shown in FIG. 10, the cover 56B may have the shape of a frame and may sandwich the connector 70B together with the second depression 67Bb. An opening of the frame-shaped cover 56B may be located on a straight line extending outward from the front end of the terminal 74B such that the external device Ma (see FIG. 6A) is connectable to the terminal 74B.

The cover 56B may have a fall-proof surface 56Ba that at least partially faces the one end 71a of the connector 70B and that prevents the connector 70B from falling out of the second depression 67Bb.

The recess 72 may be recessed relative to a side surface of the shank section 65B. In this case, the front end of the terminal 74B can be oriented outward from the recess 72 located in the side surface of the shank section 65B. In other words, the external device can be connected from a side surface of the cutting tool 30B. As a result, the degree of design freedom of the cutting tool 30B can be increased. Moreover, for example, the cutting tool 30B may be less likely to be affected by limitations of the processing path during a cutting process.

Referring to FIGS. 1 and 10, the recess 72 may be recessed relative to the second side surface 62. In this case, the front end of the terminal 74B may be oriented outward from the recess 72 located in the second side surface 62. Specifically, when the object Ob is to be cut, the front end of the terminal 74B can be oriented toward the machine tool Mt from the second side surface 62. Accordingly, an external device connected to the terminal 74B can be readily positioned toward the machine tool Mt. As a result, chips and the like occurring as a result of a cutting process may be less likely to come into contact with the external device.

In a planar perspective view from the third side surface 63 toward the fourth side surface 64, a middle part of the recess 72 (i.e., the depression 67) may be located toward the second side surface 62 relative to an intermediate position between the first side surface 61 and the second side surface 62. In this case, for example, the recess 72 can be readily disposed away from the object Ob. As a result, the terminal 74 can be readily protected from cutting oil or the like fed to the object Ob.

The connector 70B may be movable in the longitudinal direction of the shank section 65B. Accordingly, the position of the terminal 74B can be freely adjusted.

[Modification of Cutter Holder]

Figure 12:
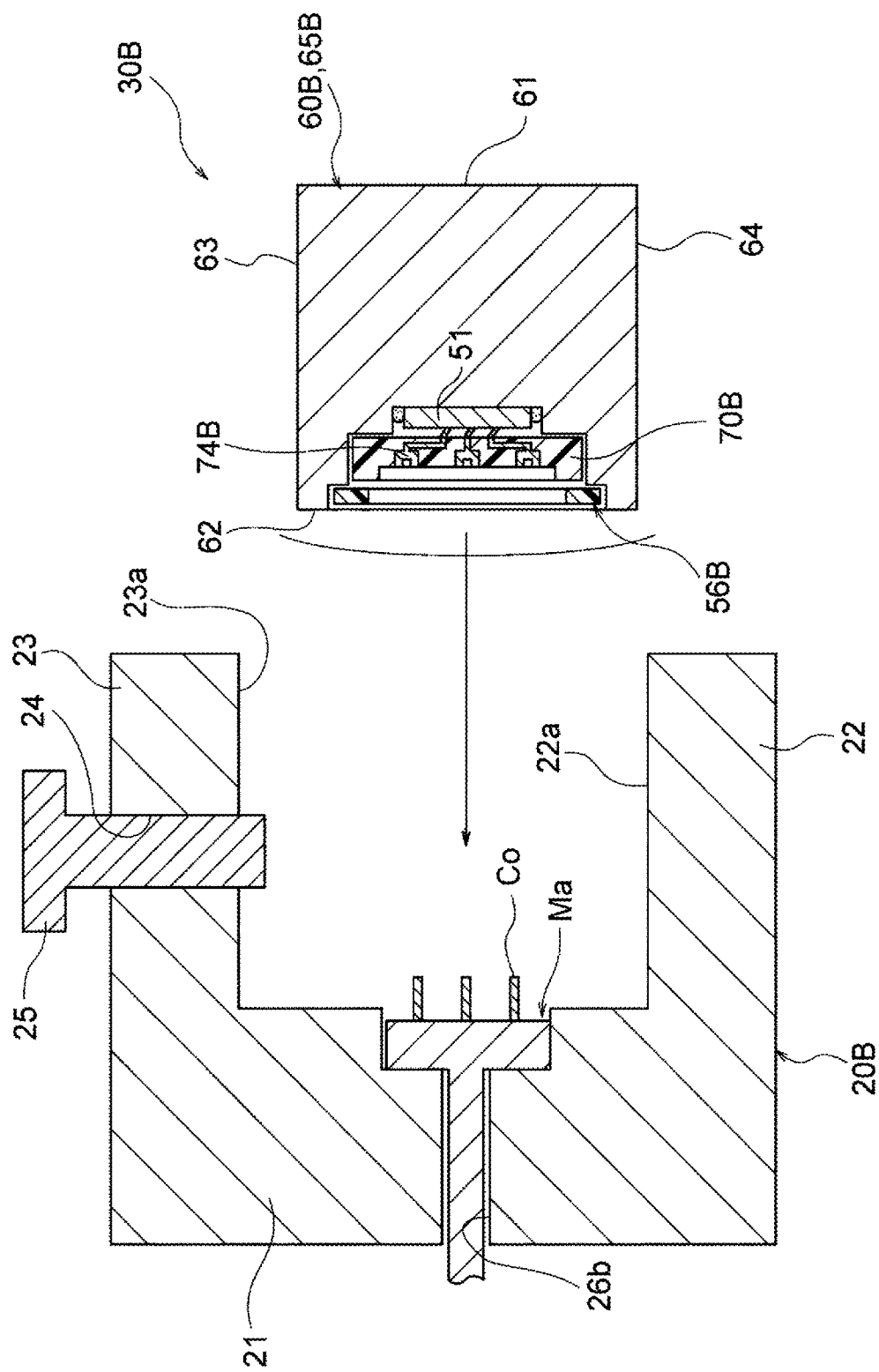
FIG. 12 illustrates a modification of the cutter holder shown in FIG. 6B.

FIG. 12 may illustrate a cutter holder 20B according to a modification in the present disclosure together with the cutting tool 30B according to the second embodiment. FIG. 12 may correspond to FIG. 6B. The cutter holder 20B according to the modification may be different from the embodiments in that it has a third through-hole 26B provided in a surface of the side-surface abutment section 21. Other basic structures may be identical to those of the cutter holder 20 according to the embodiments. Parts identical to those in the embodiments will be given the same reference signs, and detailed descriptions thereof will be omitted.

(Cutter Holder)

The cutter holder 20B may have the third through-hole 26B located in the side-surface abutment section 21 and having an opening in a side surface onto which the cutting tool 30B abuts. The external device Ma connected to the terminal 74B of the cutting tool 30B (i.e., the external device Ma connected thereto in a wired manner) may be located within the third through-hole 26B. A conductor of the external device Ma may protrude outward from the third through-hole 26B. In a case where the cutter holder 20B has the third through-hole 26B, for example, the second connector Co (i.e., the connection section) of the external device Ma connected to the cutting tool 30B may be less likely to be exposed to the outside. As a result, chips and the like occurring as a result of a cutting process may be less likely to come into contact with the external device Ma.

The cutting tool, the cutting structure, the information processing device, and the holder according to the present disclosure are not limited to the embodiments and modifications described above, and may be implemented in various modes. Several modification examples of the cutting tool, the cutting structure, the information processing device, and the holder will be introduced below.

For example, in the embodiments, a cutting tool related to a replaceable tip called a throwaway tip may be described. However, the cutting tool according to the present disclosure may be, for example, a cutting tool (i.e., a non-replaceable-type cutting tool) of a tipped type or brazed type in which the tip is joined to the base body (i.e., the holder). Instead of using a clamp, the replaceable tip may be attached and detached by inserting a screw through the tip.

For example, in each of the embodiments, the cutting tool shown may be left-hand-specific. However, the cutting tool according to the present disclosure is not limited to being left hand specific. In other words, the cutting tool according to the present disclosure may also be applicable to a right-hand-specific type, and may also be applicable to a non-hand-specific type that can be used with both the right hand and the left hand.

For example, in the embodiments, the connector serving as a separate component may be fitted in the depression such that the recess is oriented outward from the depression in the shank section. However, the connector does not have to be a separate component from the shank section and may be a part that constitutes the shank section. In other words, the depression constituting a part of the shank section may serve as a connector fittable to the external device. In this case, the terminal may be located within the recess (i.e., the depression) in the shank section and may at least partially include a part connectable to the outside.

For example, in the embodiments, the accommodation section in which the sensor is accommodated may be filled with the resin section. However, the resin section is not essential in the present disclosure and may be omitted, where necessary. In this case, for example, the accommodation section may be covered with a cover that covers the sensor such that chips and the like occurring during a cutting process do not enter the accommodation section (i.e., the depression in the second embodiment). Accordingly, the durability of the cutting tool having the sensor can be increased.

For example, in the embodiments, the information containing the physical value detected by the sensor may be input to the information processing device via the wired or wirelessly communicable external device Ma. However, for example, the external device may be the information processing device. In other words, the information processing device may be directly connected to the terminal.

The invention claimed is:

1. A cutting tool, comprising:
    a base body having a shank section and a securing section located at a front end of the shank section;
    a tip secured to the securing section and having a cutting edge;
    a sensor accommodated inside the shank section; and
    a connector located inside the shank section and oriented outward of the shank section,
    wherein the connector includes
        a recess recessed relative to an outer surface of the shank section, and
        a terminal exposed within the recess and electrically connected to the sensor, and
    wherein the sensor is closer to a rear end portion of the cutting tool than the sensor is to the tip, the recess and the terminal are entirely within the shank section,
    the base body has a side surface extending from a rear end toward a front end, and the recess is recessed relative to the side surface, and
    the connector is movable in a longitudinal direction of the shank section.

2. The cutting tool according to claim 1,
    wherein the shank section has a depression provided in the outer surface, and
    wherein the connector is entirely located within the depression.

3. The cutting tool according to claim 2,
    wherein the depression includes an inner surface and a base surface,
    wherein a surface roughness of the inner surface is greater than a surface roughness of the outer surface.

4. The cutting tool according to claim 2,
    wherein the depression includes an inner surface and a base surface,
    wherein a surface roughness of the base surface is greater than the surface roughness of the outer surface.

5. The cutting tool according to claim 1,
    wherein the tip has a flank face connected to the cutting edge,
    wherein the side surface has
        a first side surface facing a side toward which the flank face is oriented, and
        a second side surface located opposite the first side surface, and
    wherein the recess is recessed relative to the second side surface.

6. The cuting tool according to claim 1,
    wherein the tip has a rake face connected to the cutting edge,
    wherein the base body has a side surface extending from a rear end toward a front end,
    wherein the side surface has
        a first side surface facing a side toward which the flank face is oriented,
        a second side surface located opposite the first side surface,
        a third side surface facing a side toward which the rake face is oriented, and
        a fourth side surface located opposite the third side surface, and
    wherein, in a planar perspective view from the third side surface toward the fourth side surface, a middle part of the recess is located toward the second side surface relative to an intermediate position between the first side surface and the second side surface.

7. The cutting tool according to claim 1,
wherein the recess has a depth that is ½ or smaller of thickness of the shank section in a depth direction of the recess.

8. A cutting structure comprising:
cutting tool according to any one of claim 1;
a cutter holder to which the cutting tool is secured; and
a second connector connected to the connector.

9. The cutting structure according to claim 8,
wherein the cutter holder includes a placement surface on which the shank section is placed and a biasing section that abuts on the shank section and biases the shank section toward the placement surface, and
wherein the recess is located away from a straight line extending in a direction in which the biasing section biases the shank section from a center of the biasing section.

10. A data collection system comprising:
the cutting structure according to claim 8; and
a storage unit that accumulates information containing a physical value detected by the sensor via the connector and the second connector.

11. A cutting tool holder, comprising:
a base body having a shank section and a securing section located at a front end of the shank section;
a sensor accommodated inside the shank section; and
a connector located inside the shank section and oriented outward of the shank section,
wherein the connector includes a recess recessed relative to an outer surface of the shank section, and
a terminal exposed within the recess and electrically connected to the sensor, and
wherein the sensor is closer to a rear end portion of the cutting tool than the sensor is to the tip, and
wherein the connector is movable in a longitudinal direction of the shank section.

12. A cutting tool, comprising:
a base body having a shank section, a securing section located at a front end of the shank section and a side surface extending from a rear end toward a front end;
a tip secured to the securing section and having a cutting edge;
a sensor accommodated inside the shank section; and
a connector located inside the shank section and oriented outward of the shank section,
wherein the connector includes
a recess recessed relative to the side surface of the shank section, and
a terminal exposed within the recess and electrically connected to the sensor, and
wherein the sensor is closer to a rear end portion of the cutting tool than the sensor is to the tip, and
wherein the connector is movable in a longitudinal direction of the shank section.

* * * * *